US009075957B2

(12) United States Patent
Sela et al.

(10) Patent No.: US 9,075,957 B2
(45) Date of Patent: Jul. 7, 2015

(54) BACKING UP DIGITAL CONTENT THAT IS STORED IN A SECURED STORAGE DEVICE

(75) Inventors: Rotem Sela, Maalot (IL); Aviad Zer, Kfar Vradim (IL)

(73) Assignee: SANDISK IL LTD., Kfar Saba (IL)

( * ) Notice: Subject to any disclaimer, the term of this patent is extended or adjusted under 35 U.S.C. 154(b) by 704 days.

(21) Appl. No.: 12/185,728

(22) Filed: Aug. 4, 2008

(65) Prior Publication Data

US 2010/0030982 A1 Feb. 4, 2010

(51) Int. Cl.
| | |
|---|---|
| *G06F 12/14* | (2006.01) |
| *G06F 12/16* | (2006.01) |
| *G06F 21/10* | (2013.01) |
| *G06F 21/62* | (2013.01) |
| *G06F 21/64* | (2013.01) |
| *G06F 21/60* | (2013.01) |
| *G06F 11/30* | (2006.01) |

(52) U.S. Cl.
CPC .............. *G06F 21/10* (2013.01); *G06F 21/62* (2013.01); *G06F 21/64* (2013.01); *G06F 21/645* (2013.01); *G06F 12/14* (2013.01); *G06F 11/30* (2013.01); *G06F 21/60* (2013.01); *G06F 2221/2115* (2013.01); *G06F 2221/0782* (2013.01)

(58) Field of Classification Search
CPC ......... G06F 11/30; G06F 12/14; G06F 21/60; G06F 21/62; G06F 21/00; G06F 2221/2115; G06F 21/64; G06F 21/645; G06F 2221/0782
USPC ................ 713/189–193; 726/26–30
See application file for complete search history.

(56) References Cited

U.S. PATENT DOCUMENTS

| | | | |
|---|---|---|---|
| 5,715,403 A | 2/1998 | Stefik | |
| 5,892,900 A * | 4/1999 | Ginter et al. | ..................... 726/26 |
| 6,064,879 A | 5/2000 | Fujiwara et al. | |
| 7,237,123 B2 | 6/2007 | LeVine et al. | |
| 7,240,219 B2 | 7/2007 | Teicher et al. | |
| 2002/0080190 A1 | 6/2002 | Hamann et al. | |
| 2005/0137983 A1 | 6/2005 | Bells | |
| 2005/0164737 A1 | 7/2005 | Brown | |
| 2006/0248352 A1 | 11/2006 | Adams et al. | |
| 2007/0061528 A1 | 3/2007 | Shibata et al. | |
| 2007/0067403 A1 * | 3/2007 | Holmes | .......................... 709/206 |

(Continued)

FOREIGN PATENT DOCUMENTS

| | | |
|---|---|---|
| EP | 1601214 A1 | 11/2005 |
| EP | 1881440 A1 | 1/2008 |

OTHER PUBLICATIONS

Microsoft Computer Dictionary, Fifth Edition, Microsoft Press, May 2002, 3 pages.*

(Continued)

*Primary Examiner* — Michael Simitoski
(74) *Attorney, Agent, or Firm* — Toler Law Group, PC

(57) ABSTRACT

A third party facilitates preparation of a backup SSD for backing up a source SSD. Digital data of the source SSD, which includes protected and sensitive data and information, is copied to the backup SSD either by and via the third party or directly from the source SSD but under supervision of the third party. The digital data of the source SSD is copied to the backup SSD under stringent rules and only if each party (i.e., the source SSD, destination SSD, and third party) proves to a counterpart device with which it operates that it is authorized to send to it digital data or to receive therefrom digital data, depending on the device with which that party operates.

30 Claims, 11 Drawing Sheets

(56) References Cited

U.S. PATENT DOCUMENTS

| | | | |
|---|---|---|---|
| 2007/0143096 A1 | 6/2007 | Brunet et al. | |
| 2007/0248311 A1* | 10/2007 | Wice et al. | 386/52 |
| 2008/0027868 A1 | 1/2008 | Ljung et al. | |
| 2008/0162947 A1 | 7/2008 | Holtzman et al. | |
| 2009/0276829 A1 | 11/2009 | Sela et al. | |
| 2009/0276861 A1* | 11/2009 | Russo et al. | 726/30 |
| 2009/0307780 A1* | 12/2009 | Dubhashi et al. | 726/27 |

OTHER PUBLICATIONS

International Search Report and Written Opinion of International Application No. PCT/IB2009/006292, dated Feb. 12, 2010, 14 pages.

MacDonald, John A. et al., "Overcoming Channel Bandwidth Constraints in Secure SIM Applications", Feb. 2005, Smart Card Centre, Information Security Group, Royal Holloway, University of London, Egham, Surrey, England, 11 pages.

Kohiyama, Kiyoshi et al. "Digital Content Protection LSI for PC-Based Digital TV Receivers", Fujitsu Sci. Tech. J., vol. 42, No. 2, Apr. 2006, pp. 234-239.

Thomas, Barbara A. et al. "Adopting Handheld Computers for Community Based Curriculum: Case Study", Journal of the New York State Nurses Association, Spring/Summer 2001, 25 pages, vol. 32, No. 1.

Communication Pursuant to Article 94(3) EPC issued by the European Patent Office on Mar. 20, 2012 in European Application No. 09786029.0, 3 pages.

Office Action dated Apr. 2, 2013 issued in Chinese Application No. 200980125995.1, with English translation, 15 pages.

International Preliminary Report on Patentability for International Application No. PCT/IB2009/006292 issued Feb. 8, 2011, 7 pages.

Office Action issued Jan. 28, 2014 in Chinese Application No. 200980125995.1 with English translation, 4 pages.

Communication Pursuant to Article 94(3) EPC issued by the European Patent Office on Aug. 1, 2014 in European Application No. 09786029.0, 4 pages.

Office Action issued Aug. 11, 2014 in Chinese Application No. 200980125995.1 with English translation, 4 pages.

* cited by examiner

BACKING UP DIGITAL CONTENT THAT IS STORED IN A SECURED STORAGE DEVICE

FIELD OF THE INVENTION

The present invention generally relates to storage devices and more specifically to a method for backing up secure digital data, such as Digital Rights Management ("DRM") protected multimedia content (e.g., audio, movies, and games), of one secured storage device ("SSD") in another SSD either directly or via a third party, and to a system that uses the data backup method.

BACKGROUND

There are several types of protection mechanisms that prevent unauthorized duplication of secure data that are required for playing back digital content. Digital content that requires for operation secure data is referred to hereinafter as "protected digital data" or "protected data" for short. Usage rules that govern the way digital contents are played back are exemplary secure data. Some protection mechanisms are often loosely referred to, and thought of, as a type of digital rights management ("DRM). Considerable efforts have been made to stop duplication of digital content from one electronic device to another. For example, storage devices that are used with iPod devices include a protection mechanism that prohibits musical or audio-visual content from being transferred from one iPod device to another, in order to prevent unauthorized duplication of protected data. Currently, the protection mechanisms also prevent backing up protected data of one SSD in another SSD. This means that the entire digital content of an SSD cannot be backed up in another SSD because the digital content of an SSD, even if copied to another SSD, cannot be played back on the other SSD without having the related secure data copied to the other SSD along with the digital content.

Flash memory devices are an example SSDs. SIM ("Subscriber Identity Module") cards, megaSIM cards, and Universal Serial Bus ("USB") flash drives ("UFDs") are exemplary flash memory devices. SIM cards securely store service-subscriber key data that are used to identify a subscriber. SIM cards allow users to change phones by simply removing the SIM card from one phone and inserting it into another phone.

Currently, digital content that are stored is flash storage devices are protected by a technology known as "Trusted Flash". "Trusted Flash" (TF) is a data storage technology that enables consumers to buy multimedia content such as music, movies, and games, on flash memory cards for use in mobile phones, laptop computers, PDAs and other compatible devices.

Music producers and movie studios, and other multimedia content originators and providers, are more willing to release multimedia content on trusted products (also referred to herein as "supported devices") because TF technology provides the security and DRM solutions that are required by them. A DRM solution involves enforcing a DRM policy on the electronic device (e.g., cell phone, iPod). A DRM policy is a set of restrictions imposed on the electronic device, which "tell" the electronic device what operations it can do with what digital content. For example, one policy rule may allow the electronic device to play a particular song only n times, for example 3 times, another policy rule may prohibit copying of digital content; another policy rule may allow replaying a digital data stream only by a specific electronic device, and so on. Consumers will be able to download protected digital content using online digital music services, for example, through their cell phone or personal computer ("PC").

Trusted Flash enables consumers to use their purchased multimedia content in supported devices. Trusted Flash technology empowers the memory card itself to be the manager of digital rights, thus giving consumers the freedom to transfer the storage device, and its content, to other supported devices without compromising its content protection system. Trusted Flash cards can function as regular memory cards in non-secure host devices.

Storage devices, including TF memory cards and TF storage devices in general, are present in the market with a diversity of storage capabilities (e.g., 512 megabytes to 8 gigabytes). Currently, users cannot backup protected multimedia content that is stored in an SSD, for which reason important digital content, such as rare pictures and audio-visual recordings, will be lost if the original SSD on which they are recorded will be stolen, lost or damaged.

In essence, security mechanisms aim to make it impossible to backup protected data from one SSD to another, and even to copy protected data of one SSD to another SSD. This has the unfortunate result in some secured storage devices that even an authorized owner or licensee of the protected data cannot back up original digital content of one SSD in another SSD.

SUMMARY

It would therefore be beneficial to have methods and systems that would facilitate backing up secure data of one SSD digital content in another SSD, and that would allow an SSD to trust a third party to back up its multimedia content, including associated secure data, in a back up SSD in such a way that the multimedia content would be usable on the backup SSD in the same way as it was on the original SSD when it is required to swap between the original SSD and the backup SSD.

It would, therefore, be beneficial to allow an SSD to trust another SSD or a third party to hold a backup copy of its digital content and related secure and/or sensitive data in a way that the backup copy of the digital content and related secure and sensitive data would be subject to stringent rules with respect to the use thereof. Various embodiments are designed to implement such capability, examples of which are provided herein. The following exemplary embodiments and aspects thereof are described and illustrated in conjunction with systems, tools, and methods, which are meant to be exemplary and illustrative but not limiting in scope.

According to the present disclosure digital data of an SSD, which includes secure data, can be communicated to another SSD for back up by and via a trusted third party (the trusted third party is referred to hereinafter as "third party" for short). The digital data of the SSD may alternatively be communicated to another SSD for back up directly, under supervision of the third party. If the digital data of a first SSD (i.e., a "source SSD") is communicated to a second SSD (i.e., a "destination SSD") for back up by and via a third party the third party establishes a virtual secure channel between the source SSD (i.e., the SSD whose digital data needs to be backed up) and the destination SSD via which the third party reads the digital data from the source SSD and writes the read digital data into the destination SSD. The virtual secure channel is established and the digital data are transferred over the virtual secure channel after the third party, source SSD, and destination SSD satisfy back up eligibility prerequisite conditions; that is, after each party is found by the counterparty to be authorized to send the digital data to the counterparty or to receive the digital data from the counterparty, as the case may be. If the digital data of the source SSD is communicated to the destination SSD for back up directly, a direct secure channel is established between the source SSD and the destination SSD via which the destination SSD reads the digital data from the source SSD after determining that each party (i.e., the source SSD and the destination SSD) satisfies back up eligibility prerequisite conditions.

After the digital data is written into the destination SSD the third party temporarily disables the destination SSD, and upon or responsive to the third party receiving a back up request disables the source SSD and enables the destination SSD. A backup request may be initiated by a user or by a user application if the source SSD is stolen, lost, or damaged. The third party disables a stolen, lost, or damaged source SSD so that the source SSD cannot be used by any device. If the digital data of the source SSD is to be backed up by the destination SSD directly (but under the supervision of a third party) the digital data of the source SSD is copied to the destination SSD directly (i.e., without intervention of the third party) and the third party handles only the enabling/disabling aspects mentioned above and described below.

A method is provided for preparing an SSD as a backup SSD. The SSD may be, for example, a USB flash drive, an SD card, and the like. The method includes determining whether a source SSD is authorized to communicate secure data that is to be backed up by a destination SSD, the source SSD containing digital data that includes the secure data which is not transferable by the source SSD if the source SSD is unauthorized, and determining whether the destination SSD is authorized to back up the secure data from the source SSD. If the source SSD is authorized to have the secure data in it backed up by the destination SSD and the destination SSD is authorized to back up secure data from the source SSD, a secure channel is established between the source SSD and the destination SSD, and the digital data from the source SSD is copied to the destination SSD over the secure channel such that the copy of the digital data in the destination SSD is unusable until the destination SSD is enabled.

The copy of the digital data in the destination SSD may be rendered unusable either by the source SSD, by the destination SSD, by the two parties collaborating with each other, or by a third party. The copy of the digital data in the destination SSD may be made unusable prior to, during, or subsequent to copying the digital data from the source SSD to the destination SSD. The copy of the digital data in the destination SSD may be made unusable by any one of (i) changing the digital data before or as it is being copied to the destination SSD, (ii) modifying an attribute of the destination SSD, and (iii) configuring the copied digital data at the destination SSD, or applying to the data copied to destination SSD an unusable configuration.

The determination whether the source SSD is authorized to be backed up by the destination SSD may be done by the destination SSD or by the third party, and the determination whether the destination SSD is authorized to back up the source SSD may be done by the source SSD or by the third party.

The method may further include a step of preparing the destination SSD for use as a backup SSD by disabling the source SSD so that the digital data of the source SSD is rendered unusable, and enabling the destination SSD so that the digital data copied thereto is rendered usable. Disabling the source SSD is effected, for example, by a third party publishing an identifier of the source SSD, and enabling the destination SSD by the third party includes the third party reinstating or reverting data in the destination SSD, or an attribute of the destination SSD, or a configuration of the destination SSD. The identifier of the source SSD may be transferred from the source SSD to the destination SSD during mutual authentication or as data embedded in the digital data that is copied from the source SSD to the destination SSD and then to the third party. Alternatively, the identifier of the source SSD may be transferred from the source SSD directly to the third party during mutual authentication or as data embedded in the digital data that is copied from the source SSD to the third party. The method may further include a step of receiving by the source SSD or by the destination SSD a backup request initiated by a user application to back up the digital data of the source SSD in the destination SSD.

The method may further include a step in which the source SSD determines whether the third party is authorized to receive the digital data from the source SSD. If the source SSD is authorized to be backed up and the third party is authorized to receive the digital data from the source SSD, a first secure channel is established between the source SSD and the third party, and the digital data is copied from the source SSD to the third party over the first secure channel. If a third party is used to copy the digital data from the source SSD to the destination SSD the third party determines whether the destination SSD is authorized to receive the digital data, in which case the destination SSD needs to determine that the third party is eligible to send the digital data to the destination SSD before allowing the third party to send the digital data to the destination SSD.

A third party is also provided for backing up digital data of one SSD in another SSD. The third party includes an authentication manager that is configured (i) to authenticate a destination SSD that contains an unusable digital data originating from a source SSD, the digital data including protected data that are not transferable to ineligible devices, and (ii) to establish a secure channel with the authenticated destination SSD. The third party also includes a storage device configurator that is adapted (i) to disable the source SSD such that the digital data stored therein is made or rendered unusable, and (ii) to enable the destination SSD over the secure channel in order for the digital data in the destination SSD to be usable.

The storage device configurator may enable the destination SSD by reinstating, or reverting, a modified data in the destination SSD, or a modified attribute of the destination SSD, or a modified configuration of the destination SSD. The storage device configurator may be further configured to receive, via the destination SSD, an identifier of the source SSD and to publish the identifier to a host hosting the source SSD, to thereby disable the source SSD. Alternatively, the third party may obtain the identifier of the source SSD directly from the source SSD, either embedded in the digital data the third party receives from the source SSD, or during mutual authentication with the source SSD.

The third is authenticated by the source SSD prior to the third party receiving the digital data from the source SSD, and the third party receives the digital data from the source SSD over a secure channel. Additionally, the third party authenticates the source SSD prior to the third party receiving the digital data from the source SSD.

The third party further includes a data read/write mechanism to read the digital data from the source SSD and to write the read digital data into the destination SSD.

The digital data may be copied from the source SSD to the third party after determining that the third party is authorized to receive the digital data, and from the third party to the destination SSD after determining that destination SSD is authorized to receive the digital data.

An SSD is also provided to facilitate backing up protected data thereof in a destination SSD. The SSD includes a mass storage area in which digital data is, or can be, stored, the digital data including protected data that are not transferable to ineligible devices. The SSD also includes a secure storage controller that is configured to determine whether a destination SSD, or a third party, is eligible to receive therefrom the digital data and, if so, to establish a secure channel between the secure storage controller and the destination SSD, or between the SSD and the third party. The secure storage controller is also configured to transfer the digital data to the destination SSD directly, or via the third party, for back up over a corresponding secure channel.

The secure storage controller is further configured to disable the destination SSD in order to make, or render, the transferred digital data unusable. The secure storage controller may make, or render, the transferred digital data unusable prior, during, or after the SSD transfers the digital data to the destination SSD or to the third party.

The secure storage controller is further configured to transfer an identifier of the source SSD to the third party directly, or via the destination SSD, in order for the identifier to be used by the third party to disable the SSD. The secure storage controller may convey the identifier to the third party, or to the destination SSD, during mutual authentication with the third party or destination SSD, or embedded in the transferred digital data.

The secure storage controller may transfer the digital data to the third party, or to the destination SSD, after the secure storage controller determines that third party, or the destination SSD, is eligible to receive the digital data.

According to the present disclosure the SSD can be used one time as a source SSD and as a destination SSD at another time. Serving as a destination SSD the SSD's secure storage controller is further configured (i) to prove to a source SSD, or to the third party, the eligibility of the SSD (which functions now as a destination, or backup, SSD) to back up the source SSD and, upon, subsequent or responsive to proving the eligibility of the SSD, the secure storage controller is further configured (ii) to establish a secure channel between the SSD and the source SSD, or between the SSD and the third party, and to receive digital data directly from the source SSD or via the third party (whichever the case may be) over a corresponding secure channel.

If the digital data received from the source SSD is usable, the secure storage controller is further configured to disable the SSD so that the received digital data is made, or rendered, unusable. The secure storage controller may make, or render, the received digital data unusable by any of (i) changing the received digital data in the SSD, (ii) modifying an attribute of the SSD, or (iii) applying to the data copied to the SSD an unusable configuration.

The secure storage controller is further configured to prepare the SSD for use as a backup SSD by reverting the changed data in the SSD or the modified attribute of the destination SSD, or by applying or reinstating a usable configuration of the destination SSD, whereby to make, or render, the digital data in the SSD usable.

The secure storage controller may be further configured to receive an identifier of the source SSD. As part of the preparation of the SSD to operate as a backup SSD, the secure storage controller may send the identifier of the source SSD to the third party in order for the source SSD identifier to be used by the third party to disable the source SSD, so that the digital data stored in the source SSD is made, or rendered, unusable.

As part of the preparation of the SSD to operate as a backup SSD, the secure storage controller publishes the identifier of the source SSD to a host hosting the source SSD, to let the host "know" that the digital data stored in the source SSD is no longer legitimate (because the backup SSD has been put to use instead of the source SSD) and, therefore, use of the source SSD has been prohibited, the consequence of which is that the digital data stored in the source SSD is not usable.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

Figure 1:
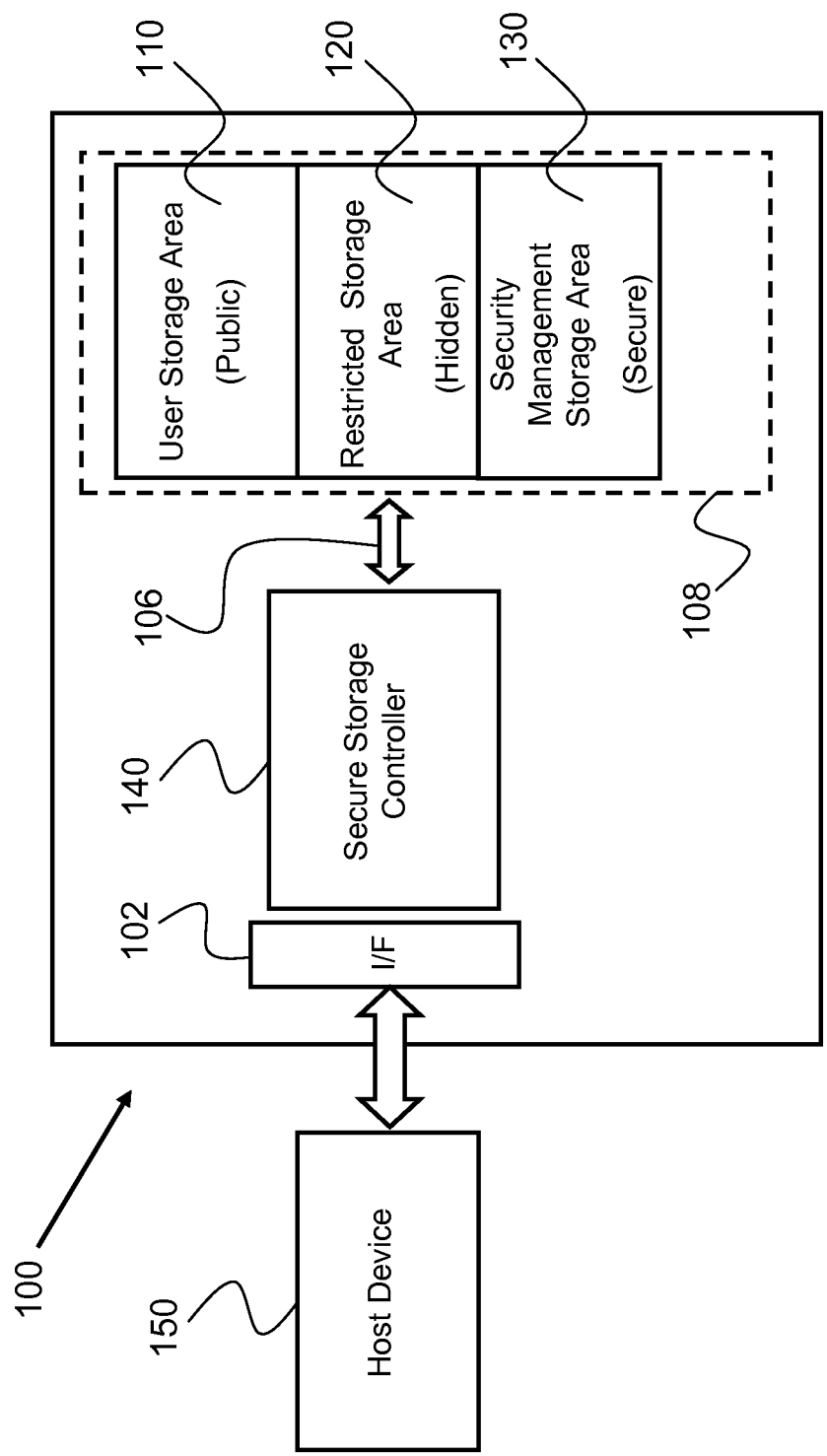
FIG. 1 is a block diagram of a typical secured storage device (SSD)

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The claims below will be better understood by referring to the present detailed description of example embodiments of the invention. This description is not intended to limit the scope of claims but instead to provide examples of the invention.

According to the present disclosure secured multimedia content (also referred to herein as "protected digital content" and "protected data") of a source SSD may be backed up in a destination SSD by and via a third party, or directly, but under the supervision of a third party. The third party is provided with authentication means that may be authentication certificate and authentication keys, to allow it to identify itself to the source SSD and to the destination SSD, and for proving to the source SSD that it is authorized to receive therefrom protected data that is part of digital data that is stored in the source SSD. The third party is also provided with authentication certificates and authentication keys that allow the third party to identify SSDs, and, in addition, to "know" whether a source SSD is authorized to be backed up by a destination SSD and whether a destination SSD is authorized to back up the source SSD.

The third party, which is a trusted computer system or a trusted application, may be local or remote (at least from one SSD's point of view) and it may independently serve multiple local or remote SSDs. "Third party" refers to any computer system or application that is configured to transfer digital content from a source SSD to a destination SSD under stringent rules in order to protect confidentiality of the protected data, and sensitive data in general, and to impart to the destination SSD the security level originally enforced by the source SSD on its digital data.

In order to facilitate DRM and additional or alternative security features, the memory space of TF cards is partitioned into several partitions, as demonstrated in FIG. 1, which is described below.

FIG. 1 shows an exemplary secured storage device (SSD) 100 according to related art. SSD 100 includes a mass storage area 108, which may be of a NAND flash variety. SSD 100 also includes a secure storage controller 140 that manages mass storage area 108 via data and control lines 106 and communicates with a host device 150 via a host interface 102. Secure storage controller 140 controls data between mass storage area 108 and host device 150 by controlling, for example, "read", "write" and "erase" operations, wear leveling, and so on. Mass storage area 108 includes a user storage area 110, a restricted storage area 120, and a security management storage area 130. If mass storage area 108 is of a NAND flash variety, restricted storage area 120 is called a "hidden storage area", and security management storage area 130 is called a "secured storage area".

User Storage Area 110

Data stored in user storage area 110 is publicly available, which means that the data stored in user storage area 110 is unconditionally available to a user of SSD 100 and to any external entity (e.g., host device 150), regardless of the identity of the host. That is, the digital data stored in user storage area 110 may include data that can be read by, or copied to, a host device (e.g., to host device 150) from SSD 100 and used (e.g., played back by host device 150) as is, without the host device having to authenticate itself to SSD 100. User storage area 110 may hold, for example, multimedia content, audio-visual content, etc.

User storage area 110 may also include protected data that can be used by a host device only if the host device gets also usage rules that indicate to the host device how to use the protected data. Failing to get such rules, the host device will not be able to use the protected data. Only a host device that authenticates itself to SSD 100 can get usage rules, as described below in connection with restricted storage area 120 and secure management storage area 130.

Restricted Storage Area 120

Restricted storage area 120 may hold restricted data (and optionally metadata and information) that represent, or are related, for example, to usage rights associated with digital data that is held in user storage area 110. Restricted data that are stored in restricted storage area 120 are accessible only to authorized devices. Data representing DRM rules are exemplary restricted data because they govern the usage of digital content and, as such, they are intended only for authorized devices.

"Protected data" refers to any data, file, application or routine, that is stored in an SSD but is accessible only internally (i.e., to the SSD's controller) or to external authorized devices. Transfer of such data, file, application or routine to an external device such as host device 150 can either be prohibited, or the data, file, application or routine can be allowed to be transferred or copied to another device but be useless on the external device without the external device using proper means (e.g., decryption keys) to access or use the data, file, application or routine.

Security Management Storage Area 130

In general, a security management storage area may contain authentication keys of devices that are entitled to access the restricted storage area of a storage device. Turning again to FIG. 1, data stored in security management storage area 130 (referred to hereinafter as a "security data") is available only to secure storage controller 140 for internal processes (e.g., authentication) but not to host device 150 or to the host device's user. The security data held in security management storage area 130 may include, for example, the system's firmware, any data type of operating parameter (e.g., encryption and decryption keys, digital authentication certificates attesting to the identity, capabilities and privileges of SSD 100 and external devices), and other data that is desirable to have safeguarded from unfettered access, which would be the case if they were stored in user storage area 110. Authentication certificates of devices (e.g., media players and cell phones) specify to the secure storage controller 140 the devices that are entitled to use data that is held in the restricted storage area 120, and encryption/decryption keys that are stored in security management storage area 130 can be utilized by secure storage controller 140 to encrypt and decrypt data that is stored in SSD 100. The security data held in security management storage area 130 typically is related to security applications or to security routines.

A security application is traditionally intended to function only on the SSD upon which it was loaded. For example, a security application may generate one time passwords by using a serial number or other data (e.g., a secrete number) of the secured storage, and then submit them for login or verification of a user or user's account. This is only an example, and any number of algorithms used in security or other functions may be based, at least in part, upon storage device specific data. Security applications may be loaded over time by a user.

The security of digital data may be provided by the SSD 100 system's firmware and/or hardware, by encryption/decryption keys, and/or by security applications. In some cases, copy-protected content is encrypted and although the encrypted content may be copied from restricted storage area 120 to another device or application, it cannot be decrypted by the other device or application unless the other device or application is authenticated by SSD 100 and has the proper key(s) to decrypt the encrypted content.

Secure storage controller 140 utilizes security routines and security-related data (e.g., encryption keys) to impart security capabilities to SSD 100, which means, for example, that SSD 100 prohibits illegal use of the protected digital content stored in SSD 100 and generation of illegal copies thereof. To accomplish this, secure storage controller 140 controls the access to content held in restricted storage area 120 based on security data (e.g., keys, authentication certificates, security routines, etc.) that are held in security management storage area 130. Authentication may be executed by using the Private Key Infrastructure ("PKI"), symmetric keys, password-based schemes, or any other authentication scheme.

"PKI" is a well known security paradigm. In cryptography, PKI is an arrangement that binds public keys with respective user identities by means of a certificate authority (CA). The user identity must be unique for each CA. The binding is established through the registration and issuance process, which, depending on the level of assurance the binding has, may be carried out by software at a CA, or under human supervision. For each user, the user identity, the public key, their binding, validity conditions and other attributes cannot be forged if they are in public key certificates issued by the CA.

PKI arrangements enable computer users without prior contact to be authenticated to each other and to use the public key information in their public key certificates to encrypt messages to each other. In general, a PKI consists of client software, server software, hardware (e.g., smart cards), legal contracts and assurances, and operational procedures. A signer's public key certificate may also be used by a third-party to verify the digital signature of a message, which was made using the signer's private key. In general, a PKI enables the parties in a dialogue to establish confidentiality, message integrity and user authentication without having to exchange any secret information in advance, or even any prior contact. In cryptography, a public key certificate (or identity certificate) is an electronic document which incorporates a digital signature to bind together a public key with identity information. The certificate can be used to verify that a public key belongs to an individual. In a typical PKI scheme the signature will be of a certificate authority (CA).

Turning again to FIG. 1, host device 150 cannot directly access mass storage area 108. That is, if host device 150 asks for or needs data from SSD 100, host device 150 has to request it from secure storage controller 140, regardless of whether the requested data is held in user storage area 110, in restricted storage area 120, or in security management storage area 130. If the data requested by host device 150 is stored in restricted storage area 120, secure storage controller 140 checks whether host device 150 is authorized to get that data by utilizing security data that is stored in security management storage area 130.

In order for host device 150 (an exemplary device) to use, for example, media content that is held in user storage area 110, host device 150 communicates with secure storage controller 140, and secure storage controller 140 utilizes data that is stored in security management storage area 130 to check whether the host device 150 is entitled to use the media content that is held in user storage area 110. If host device 150 is entitled to use the media content that is held in user storage area 110, secure storage controller 140 allows host device 150 to use that data based on usage rules, or restrictions, that are held in restricted storage area 120.

If SSD 100 is used with a supported device, which may be, for example, an MP3 player, the data stored in restricted storage area 120 is usable by the supported device but is inaccessible to the user of the device. The reason for this restriction is that the restricted storage area 120 contains sensitive data or information that specify to external devices the rules (DRM or others) governing the usage of the multimedia content, and the restricted storage area 120 is made inaccessible to the SSD 100 user in order not to allow the user to manipulate or violate the DRM rights or usage rules.

Backing up multimedia content of one SSD in another SSD involves copying the multimedia content from the first SSD to the other SSD. Copying the multimedia content, though, requires that the DRM rights, authentication particulars (i.e., digital authentication certificates, keys, etc.), and other information pertaining to the multimedia content, be copied as well. However, as explained above, being stored in restricted storage area 120 of the SSD 100, this information (i.e., DRM rights, authentication particulars, etc.) is inaccessible to the user, for which reason even though the user may be able, in some cases, to copy the multimedia content in question to another SSD, the other SSD will not be able to use (e.g., play back) the copied multimedia content.

As another example, security applications relating to medical or financial records can be loaded into SSD 100. These applications may be executed by secure storage controller 140 alone or in combination with a processor (not shown in FIG. 1) of host device 150, and these applications may not only handle confidential information, but also the secret information used in encrypting and safeguarding the sensitive contents of the secured storage. As such, SSD 100 and host device 150 may be functionally deeply interconnected and reliant upon the security mechanisms and information within the SSD 100. In some cases, the security mechanisms of the applications themselves utilize secured storage specific information and will not function on another secured storage. The applications themselves may also be encrypted and device-specific in order to prevent them from being misused (e.g., copied and hacked).

Figure 2:
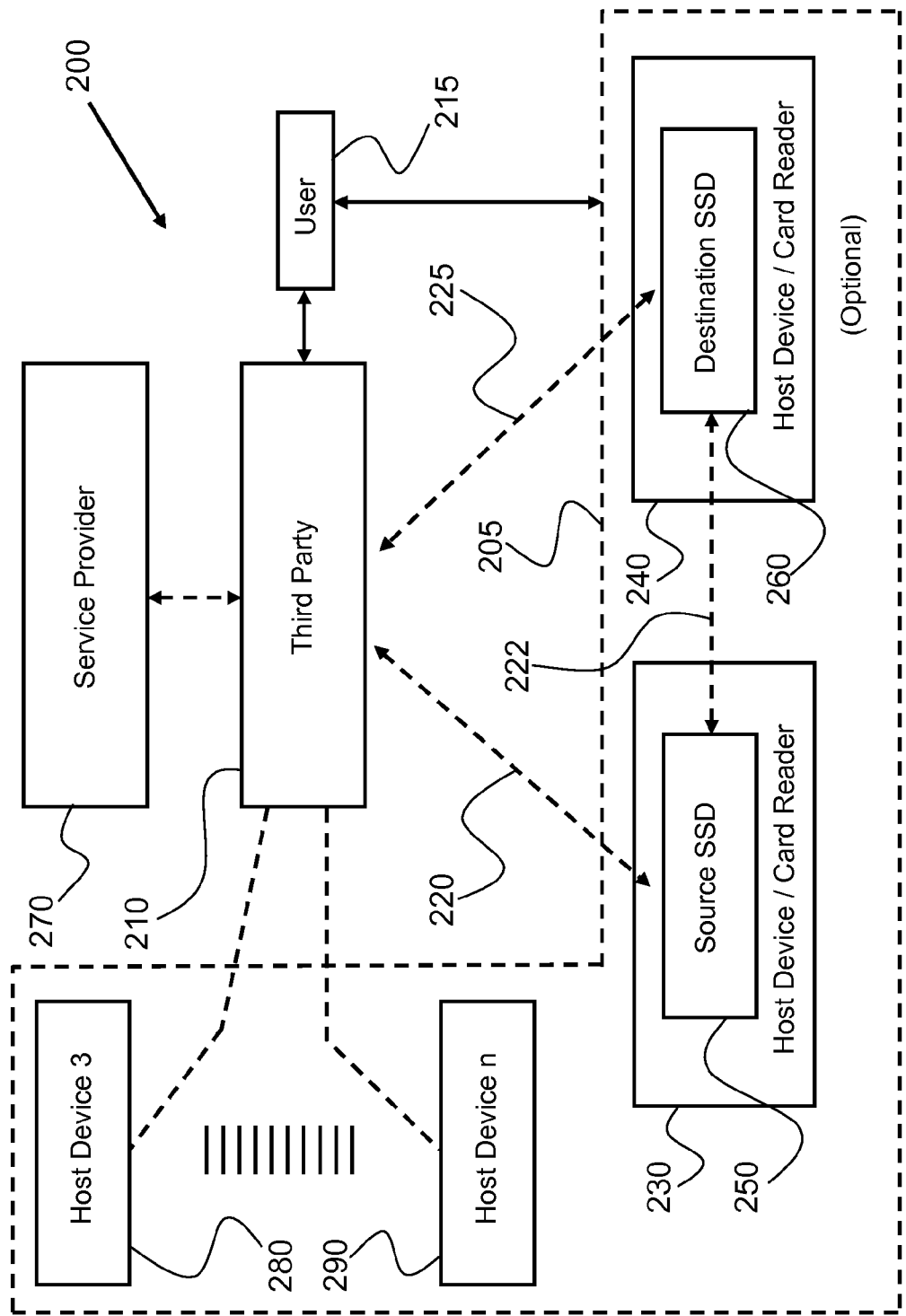
FIG. 2 schematically illustrates a system for copying protected data from one SSD to another according to an example embodiment.

FIG. 2 schematically illustrates a data back up system 200 for backing up protected data of a source SSD 250 in a destination SSD 260 by and via a third party 210. In general, system 200 includes a host device system 205 for hosting, or accommodating, source SSD 250 and destination SSD 260, and other or additional host devices, and a third party 210 that is operatively connected to host device system 205, exemplary operative connections being shown in FIG. 2 as dashed lines 220 and 225. Source SSD 250 contains digital data that includes protected data that are not transferable to, accessible by, and usable by ineligible devices. That is, a digital content that is downloaded to an SSD through a media player (such as MP3) or cell phone from a multimedia content provider is usually intended only for the specific media player it was loaded to, and any other SSD is regarded as an ineligible device, for it cannot receive protected data from any other SSD, nor can it access such data in another SSD or use it in any way.

Binding the digital content to the specific media player is done by the SSD binding usage rules (e.g., DRM policy rules) to the digital content and enforcing these rules on the digital content. In order to prevent use of the digital content by an unauthorized device, the secure storage controller of the SSD does not allow such devices (i.e., unauthorized devices) to access the usage rules and the security features that are stored in its restricted storage area and in its secured management storage area. However, a corresponding certificate may be issued by a trusted certificate authority ("CA") and provided to SSDs in order to "tell" the SSDs that there is a trusted entity (i.e., the trusted third party) that has permission or mandate to backup digital data (including protected data) of one SSD in another SSD. A third party having a permission or mandate to backup digital data is said to be, or is thought of as, "trusted". Depending on circumstances, such a third party may temporarily hold a backup copy of a source SSD's digital content until the third party transfers the backup copy to the destination SSD, or the third party may transfer the source SSD's digital data to the destination SSD at a single session without keeping a copy of the backed up digital content.

Third party 210 may be owned by a service provider such as service provider 270. If third party 210 is owned by service provider 270, users will need a service agreement with service provider 270 to allow them to back up the entire digital data (including protected data) of one SSD (e.g., source SSD 250) in another SSD (e.g., destination SSD 260) via third party 210. Service provider 270 will need to have an agreement with the entity that places the authentication certificates in the SSDs, that entity usually being the SSDs' manufacturer.

In some cases, though, some SSDs may not be entitled to the data back up service rendered by the third party. Therefore, the data back up process described herein is contingent on several back up eligibility prerequisite conditions, such as the source SSD proving to third party 210 of its eligibility to be serviced; i.e., that its digital data can be backed up in another (i.e., destination) SSD. Likewise, third party 210 has to prove to source SSD 250 its eligibility to receive therefrom the entire digital data (including the protected data). If the source SSD is unable to prove its eligibility to be serviced, the third party will not read the digital data from the source SSD. If the third party is unable to prove its eligibility to receive the digital data from the source SSD, the source SSD will not allow the third party to read its digital data.

After third party 210 proves to source SSD 250 its eligibility to receive therefrom the digital data, and upon source SSD 250 proving to third party 210 is eligible to be backed up in destination SSD 260, third party 210 establishes a first secure channel 220 with source SSD 250, which is part of a virtual secure channel that is yet to be established, through third party 210, between source SSD 250 and destination SSD 260. By "secure channel" is meant a communication channel over which ciphered data is communicated. By "virtual secure channel" is meant a secure channel whose establishment is proactively commenced by and via a third party between a source SSD and a destination SSD, in a way that digital data of a source SSD are backed up in a destination SSD without the source SSD and the destination SSD communicating with each other directly. The secure channel is "virtual" also in the sense that it includes two separate and independent secure channels (e.g., secure channels 220 and 225) that can be established by the third party at the same time, concurrently, or at different times.

After third party 210 and source SSD 250 establish first secure channel 220, third party 210 receives, or reads, the entire digital data from source SSD 250 over first secure channel 220, and concurrently, or at any time thereafter, establishes second secure channel 225 with destination SSD 260 to complete the virtual secure channel between source SSD 250 and destination SSD 260. Third party 210 may receive from a user 215 an instruction to establish second secure channel 225 with destination SSD 260, for example, immediately after third party 210 receives the digital data from source SSD 250, a few seconds later, three months later, etc.

A destination SSD must prove to the third party its eligibility to receive digital data originating from an SSD. Upon proving to third party 210 that destination SSD 260 is eligible to receive the digital data originating from source SSD 250, third party 210 transfers, copies, or writes, the digital data it received or read from source SSD 250 to destination SSD 260 over the second part of the virtual secure channel (i.e., over secure channel 225).

As part of the trust source SSD 250 has in third party 210, no two legitimate copies of the digital data (i.e., one in the source SSD and the other in the destination SSD) can exist. By "no two legitimate copies of the digital data can exist" is meant that, although a copy of an original digital data can, or does, exist in a destination (i.e., in a backup) SSD, it cannot be used by any device so long as the original digital data in the source SSD is, or is regarded as, the legitimate or usable data. If, for some reason, it is desired or required to use the backup copy instead of the original digital data, then it is required to make, or render, the digital data in the destination SSD usable, and to make, or render, the original digital data in the source SSD unusable. In order to ensure that only one version of the digital data (i.e., the original data in the source SSD or the copy thereof in the destination SSD) can be used, third party 210 disables operation of destination SSD 260. By "disabling operation of destination SSD" is meant causing, by the third party, protected data in the destination SSD to be unusable by, or inaccessible to, any device, including by/to the SSD that originally holds the protected data. Disabling a destination SSD may be effected, for example, by causing the destination SSD to reversibly manipulate data that is stored in the destination SSD in order to prevent future use of the destination SSD's protected data, that is, so long as the source SSD is usable.

Third party 210 may cause destination SSD 260 to manipulate data stored therein by communicating to it a corresponding instruction or command. Third party 210 may cause destination SSD 260 to manipulate the data stored therein at any time after third party 210 receives the digital data from source SSD 250. In one example third party 210 causes destination SSD 260 to manipulate data stored therein upon, or subsequent to, completion of transfer of the digital data from source SSD 250 to third party 210 and before third party 210 transfers the digital data to destination SSD 260. In another example third party 210 causes destination SSD 260 to manipulate the data stored therein upon, or subsequent to, completion of transfer of the digital data to destination SSD 260. Third party 210 may cause destination SSD 260 to manipulate the data stored therein between the two extreme instances described above.

Manipulation, by third party 210 of data that is stored in destination SSD 260, may include disabling, erasing, or modifying security features in destination SSD 260 which are associated with the protected data. The type, amount, or location (i.e., in the SSD's storage area) of the data to be manipulated can be chosen such that after its manipulation the protected data of destination SSD 260 becomes inaccessible to any device, and, in addition, that the manipulation itself is reversible, so that the data, information, or application, required to use the backup copy can be reinstated or reverted. Alternatively, manipulation, by third party 210, of data that is stored in the destination SSD 260 may include disabling, erasing, or modifying authentication parameters held in destination SSD 260, which are associated with the protected data, such that no device can use the protected data. Third party 210 may alternatively cause the access to the protected data in the destination SSD 260 to be blocked by sending a corresponding block command to destination SSD 260 to block access to the protected data to any device.

The digital data received by the destination SSD may be made, or rendered, unusable either by the source SSD or by the destination SSD, by altering the digital data in the source SSD prior to communicating it to the destination SSD or to the third party, or thereafter in the destination SSD, or by modifying an attribute of the destination SSD, or by applying to the data copied to the destination SSD an unusable configuration. The digital data received by the destination SSD may be made, or rendered, unusable by sending, by the source SSD, the digital data to the destination SSD, or to the third party, as compressed data and storing (i.e., concealing) the compressed data in the hidden or restricted storage area similar to hidden area 120 in FIG. 1. In order to make, or render, the digital data usable (i.e., to enable the destination SSD), the third party, or the destination SSD, decompresses the compressed data; parses the uncompressed data according to the type and/or function of the various data items, and stores each parsed data item in the mass storage area in the corresponding storage area, whether it is the user storage area, the restricted storage area or the security management storage area.

Source SSD 230 is similar to SSD 100 of FIG. 1, except that, according to the present disclosure, the secure storage controller of source SSD 250 (the secure storage controller of source SSD 250 is not shown in FIG. 2) is also configured to determine whether destination SSD 260 or third party 210, which ever the case may be, is eligible to receive therefrom the digital data and, if so, to establish a secure channel between the secure storage controller of source SSD 250 and destination SSD 260 (i.e., secure channel 222), or between source SSD 250 and third party 210 (i.e., secure channel 220). According to the present disclosure the secure storage controller of source SSD 250 is further configured to transfer the digital data to destination SSD 260 for back up directly or via third party 210, over the corresponding secure channel (i.e., over secure channel 222 or 220, respectively).

The secure storage controller of source SSD 250 may disable destination SSD 260 in order to make, or render, the transferred digital data unusable. The secure storage controller of source SSD 250 may make, or render, the transferred digital data unusable prior, during, or after source SSD 250 transfers the digital data to destination SSD 260 or to third party 210. The secure storage controller of source SSD 250 may transfer an identifier of source SSD 250 to third party 210 directly, or via destination SSD 260, in order for the identifier to be used by third party 210 to disable source SSD 250. The secure storage controller of source SSD 250 may convey the identifier of source SSD 250 to third party 210, or to destination SSD 260, during mutual authentication with third party 210 or with destination SSD 260, or (as data) embedded in the transferred digital data. The secure storage controller of source SSD 250 may transfer the digital data to third party 210, or to destination SSD 260, after third party 210, or destination SSD 260, is determined to be eligible to receive the digital data. The determination whether third party 210, or destination SSD 260, is eligible to receive the digital data may be made by the secure storage controller of source SSD 250, or by a dedicated application running on source SSD 250.

As may be appreciated, an SSD may function, or be regarded, as a source SSD at one time, and as a destination (i.e., backup) SSD at another time. Therefore, having the potential to serve as a backup/destination SSD the secure storage controller of an SSD (in this case a destination SSD) is further configured to prove to a source SSD (e.g., destination SSD 260 proving to source SSD 250), or to a third party, the eligibility of the SSD to back up the source SSD. Upon, subsequent or responsive to proving the eligibility of the SSD to back up the source SSD, the secure storage controller is further adapted to establish a secure channel between the SSD and the source SSD, or the third party, and to receive digital data directly from the source SSD, or via the third party, over the corresponding secure channel.

The digital data that the destination SSD receives directly from the source SSD or from the third party may be usable or unusable. That is, the source may make or render its digital data unusable before sending it to the destination SSD or to the third party. Alternatively, the source SSD may send its digital data as is, in which case the receiving party may use the digital data if it is authorized, or eligible, to do so. If the digital data received from the source SSD is usable, the secure storage controller of the SSD is further configured to disable the SSD so that the received digital data is made, or rendered, unusable for as long as the source SSD is legitimately used.

The secure storage controller may make, or render, the received digital data unusable, for example, by changing the received digital data in the SSD, by modifying an attribute of the SSD, or by applying to the data copied to the SSD an unusable configuration. The secure storage controller may prepare the SSD for use as a backup SSD by reverting changed data in the SSD or modified attribute of the destination SSD, or by applying a usable configuration of the destination SSD (i.e., replacing the unusable configuration of the SSD with a usable configuration), whereby to make, or render, the digital data in the (destination/backup) SSD usable.

The secure storage controller of the SSD may receive an identifier of the source SSD and, as part of the preparation of the SSD to operate as a backup SSD, send it to the third party in order for it to be used by the third party to disable the source SSD. The third party may, when requested to do so by an end-user or by a user application, publish the identifier of the source SSD to the host hosting the source SSD, so that the digital data stored in the source SSD will not be used. Alternatively, the secure storage controller may publish the identifier of the source SSD instead of the third party.

Third party 210 may be a computer system that is trusted by source SSDs such as source SSD 250 and by destination SSDs such as destination SSD 260. Third party 210 may be an application that runs on a computer system and is trusted by source SSDs 250 and destination SSDs.

Host device system 205 includes two separate host devices 230 and 240. Each of host devices 230 and 240 may have a card reader to accommodate an SSD, or a secure USB device that can read SSDs. Each of the card readers may accommodate a source SSD or a destination SSD. By way of example, the card reader of or associated with host device 230 accommodates source SSD 250 and the card reader of or associated with host device 240 accommodates destination SSD 260. Any suitable conventional card reader may be used to read content/data from an SSD.

A host device system may include one host device (e.g., host device 230, host device 240 being optional) that may include, or have associated with it, one card reader for accommodating the source SSD and the destination SSD (not at the same time), or two card readers, one for each SSD. Alternatively, a host device system may include two host devices (e.g., host devices 230 and 240), where each host device has its own card reader. If the host device includes one card reader, backing up the digital data of a source SSD in a destination SSD (by using the data back up service rendered by the third party) involves, among other things, using the card reader a first time to read and transfer the digital data, over the first secure channel, from the source SSD to the third party and, after replacing the source SSD with the destination SSD, a second time to write, transfer, or copy the digital data from the third party to the destination SSD over the second secure channel. A card reader associated with a host device may be an integral part of the host device, or external to the host device and operatively connected to the host device.

Each of source SSD 250 and destination SSD 260 may be identical or similar to SSD 100 of FIG. 1. Source SSD 250 may contain a digital data that may include user accessible multimedia content and protected data, which may include copy-protected data, secrete data, secrete metadata, security applications, DRM files, and the like, which the SSD's user may decide to back up in destination SSD 260. Backing up also the source SSD's protected data in destination SSD 260 will impart to destination SSD 260 the same security level associated with, or originally enforced by, source SSD 250 on the digital content.

Host device system 205 may include additional multiple host devices, designated as "host device 3" (shown at 280) through "host device n" (shown at 290), to which third party 210 may be operatively connected. A host device may be located locally or remotely with respect to the third party 210. The communication between third party 210 and any of the host devices of host devices system 205 may be performed via any combination of a dedicated communication cable, a landline, a data network, the Internet, and wireless communication link.

Figure 3:
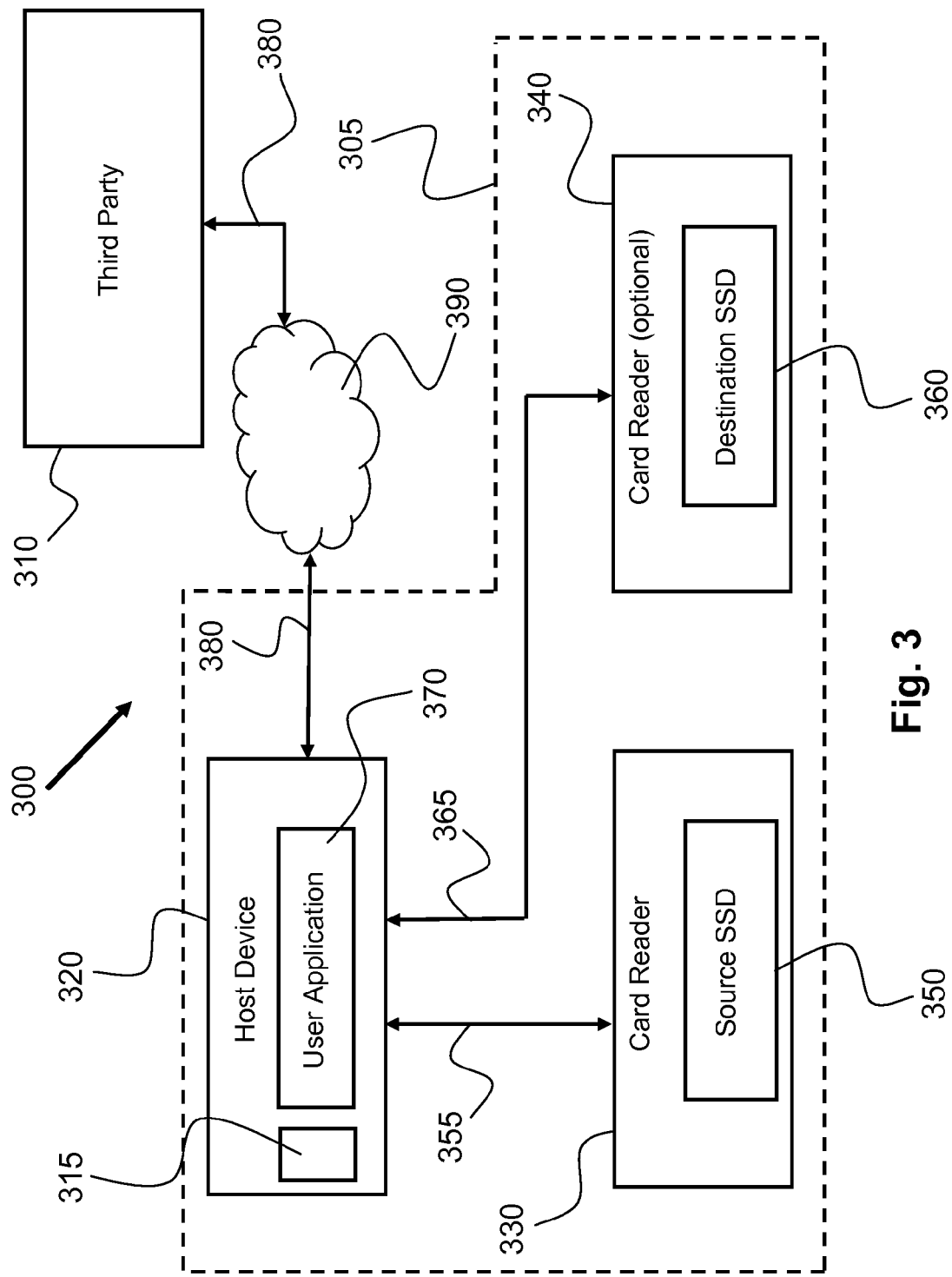
FIG. 3 schematically illustrates a system for copying protected data from one SSD to another according to another example embodiment.

FIG. 3 schematically illustrates a data back up system 300 for backing up digital data, including protected data, of a source SSD 350 in a destination SSD 360, via a third party 310, according to an example embodiment. A data back up process includes a first phase (referred to herein as the "data-copy phase") of copying the digital data of a source SSD to a destination SSD, and a second phase (referred to herein as the "post data-copy phase") of reversibly disabling the destination SSD for as long as the owner or user of the source SSD can use source SSD 350.

Third party 310 is operatively connected, via data network (e.g., the Internet) 390, to a host device system 305. Host device system 305 includes one host device 320 that has associated with it two card readers: card reader 330 and card reader 340. Card readers 330 and 340 are external to host device 320. By way of example, card reader 330 accommodates source SSD 350 and card reader 340 accommodates destination SSD 360.

After satisfying eligibility prerequisites that are specified above, third party 310 establishes a virtual secure channel between source SSD 350 and destination SSD 360, by establishing a first secure channel with source SSD 350 and a second secure channel with destination SSD 360. The first secure channel is established over communication lines 355 and 380, and via data network 390, and the second secure channel is established over communication lines 365 and 380, and via data network 390.

Host device 320 includes a user application 370 and a user interface 315. User interface 315 may be, for example, a keypad or a touchscreen. User interface 315 enables a user to interact with user application 370. For example, the user may use user interface 315 to enter an instruction that indicates to user application 370 that source SSD 350 and destination SSD 360 are in place (i.e., source SSD resides in card reader 330 and destination SSD resides in card reader 340), waiting to be serviced by third party 310, and that the digital data of source SSD 350 can be backed up in destination SSD 360 if eligibility prerequisites are satisfied. Responsive to such instruction, user application 370 sends to third party 310, via communication link 380 and data network 390, a message to third party 310 that instructs third party 310 to commence a data back up session with the SSD in question; e.g., first with source SSD 350 and then with destination SSD 360.

In order to commence the data copy phase third party 310 logs on, over the first secure channel and via host device 320, into source SSD 350, for example by using a system Access Control Record ("ACR") of source SSD 350. If third party 310 and source SSD 350 authenticate each other and third party 310 proves to source SSD 350 its eligibility to receive therefrom digital data, source SSD 350 allows third party 310 to read whatever data source SSD 350 holds in its mass storage area, including protected data, and, in general, each data that is requested by third party 310. If source SSD 350 proves to third party 310 its eligibility to be backed up by another SSD, third party 310 will read the digital data from source SSD 350.

After third party 310 reads the digital data from source SSD 350 third party 310 logs on, over the second secure channel and via host device 320, into destination SSD 360 system, for example by using a system ACR of destination SSD 360. If third party 310 and destination SSD 360 authenticate each other and destination SSD 360 proves to third party 310 its eligibility to back up source SSD 350, third party 310 writes the data it read from source SSD 350 into destination SSD 360, to thereby complete the data copy phase.

Third party 310 commences the second phase (i.e., "post data-copy" phase) by reversibly disabling destination SSD 360 for as long as the owner or user of source SSD 350 can use source SSD 350, and, optionally, disabling source SSD 350 and enabling destination SSD 360 if, for some reason, the owner or user of source SSD 350 can no longer use source SSD 350, for example because it has been stolen, lost, or damaged.

Figure 4:
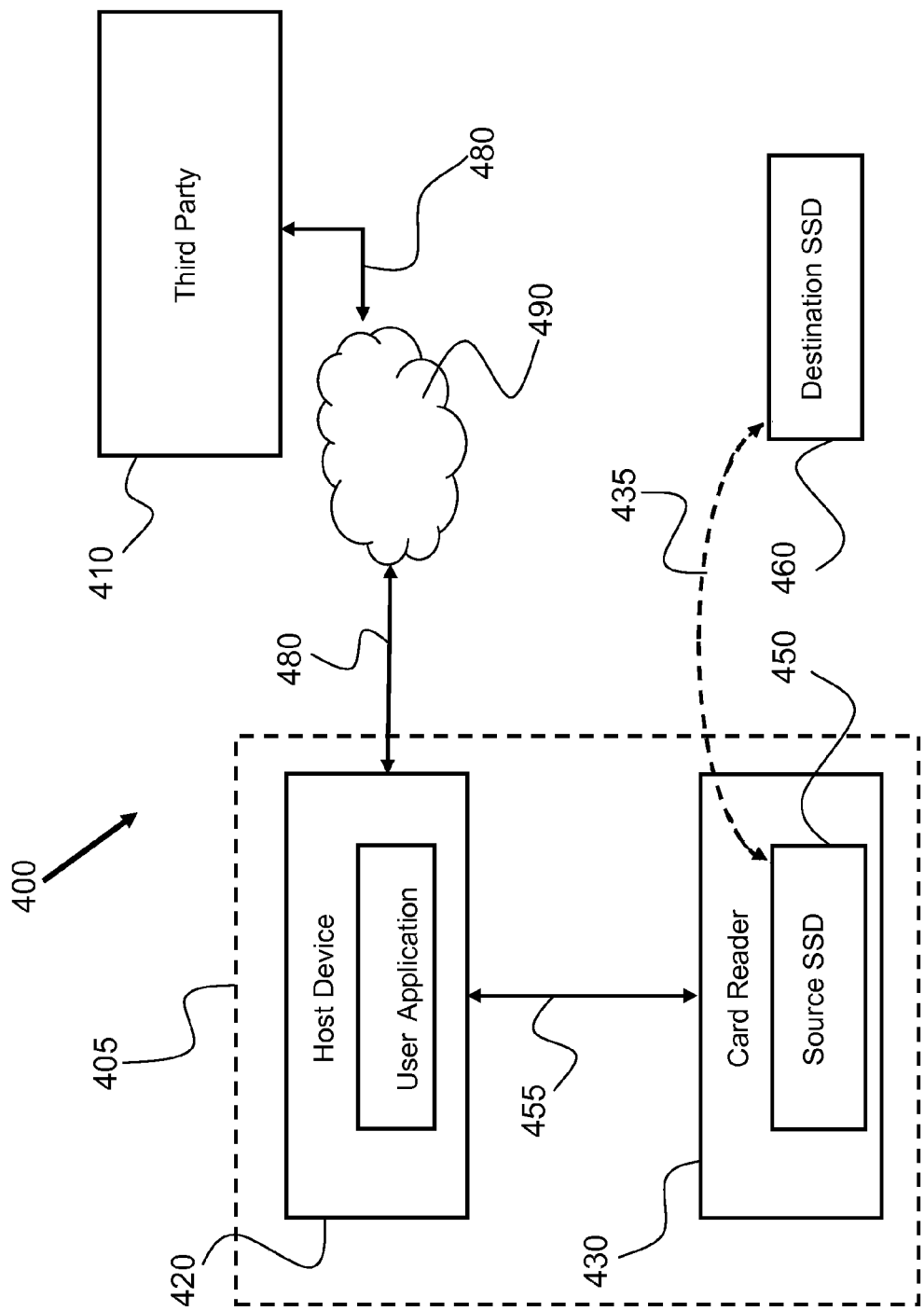
FIG. 4 schematically illustrates a system for copying protected data from one SSD to yet another according to another example embodiment of the present disclosure.

FIG. 4 schematically illustrates a system 400 for backing up digital data, including protected data, of a source SSD 450 in a destination SSD 460, via a third party 410, according to another example embodiment. Third party 410 is operatively connected, via data network (e.g., the Internet) 490, to host device system 405. Host device system 405 includes one host device (shown at 420) that has associated with it one card reader: card reader 430. Card reader 430 is external to host device 420. By way of example, card reader 430 is shown accommodating source SSD 450, but it can accommodate destination SSD 460 as well.

After satisfying the specified eligibility prerequisites, third party 410 establishes a virtual secure channel between source SSD 450 and destination SSD 460. In order to establish the virtual secure channel between source SSD 450 and destination SSD 460 third party 410 establishes a first secure channel with source SSD 450, over which third party 410 reads digital data from source SSD 450, and, after replacing, or swapping, source SSD 450 with destination SSD 460 (the replacement symbolically shown by dashed line 435), a second secure channel with destination SSD 460. The first secure channel and the second secure channel can be established over the same communication lines 455 and 480 because third party 410 deals with the two SSDs one SSD at a time.

Figure 5:
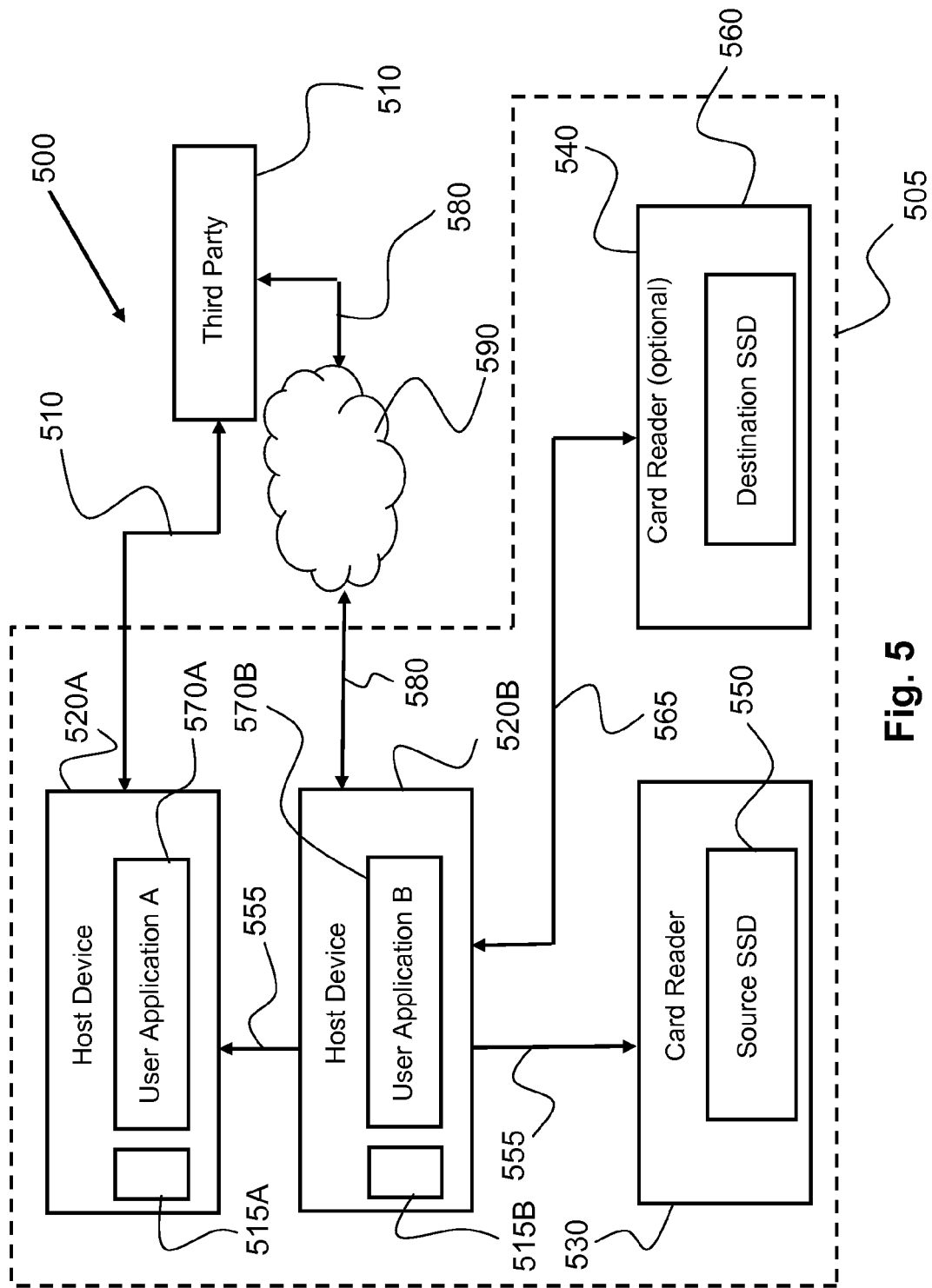
FIG. 5 schematically illustrates a system for copying protected data from one SSD to another according to yet another example embodiment.

FIG. 5 schematically illustrates a system 500 for backing up protected data of source SSD 550 in destination SSD 560, via a third party 510, according to yet another example embodiment. Third party 510 is operatively connected, via data network (e.g., the Internet) 590, to host device system 505. Host device system 505 includes two host devices, host device 520A and host device 520B, each host device having associated with it one card reader and a user application. Card reader 530 and user application 570A are associated with host device 520A. Card reader 540 and user application 570B are associated with host device 520B. Card reader 530 and card reader 540 are external to the respective host device. However, as explained above, a card reader may be an integral part of or embedded in a host device. By way of example, card reader 530 accommodates source SSD 550 and card reader 540 accommodates source SSD 560.

Host devices 520A and 520B may be operatively connected to third party 510 by using the same type of communication path, or different types of communication paths. By way of example, host device 520A is operatively connected to third party 510 via a landline 510, and host device 520B is operatively connected to third party 510 via a communication path 580 and a data network 590. The configuration of FIG. 5 is useful, for example, in cases where a user wants to back up the digital data of her/his SSD in a remote SSD that belongs to another person. The user's host device (e.g., host device 520A) may be located, for example, in one city and the other person's host device (e.g., host device 520B) may be located in another city.

Each of user applications 570A and 570B may include two separate and independent procedures: a "reading procedure" and a "writing procedure". The reading procedure allows a user to instruct a third party to read digital data from a source SSD, and the writing procedure allows the same user, or another user, to instruct the third party to write the read digital data to a local or remote destination SSD. The user may select, activate, or otherwise cause or trigger the execution of the proper procedure (i.e., reading procedure or writing procedure) according to the role of the SSD (i.e., source SSDA or destination SSD). Referring again to FIG. 5 a first user may select, activate, or otherwise cause or trigger (e.g., by using user interface 515A) the execution of the reading procedure to cause third party 510 to read digital data from source SSD 550. A second user may select, activate, or otherwise cause or trigger (e.g., by using user interface 515B) the execution of the writing procedure to cause third party 510 to write the read digital data to destination SSD 560.

If the eligibility prerequisites specified above are satisfied, third party 510 establishes a virtual secure channel between source SSD 550 and destination SSD 560. In order to establish the virtual secure channel between source SSD 550 and destination SSD 560 third party 510 establishes a first secure channel (via communication paths 510 and 555) with source SSD 550, via which third party 510 reads the digital data from source SSD 550, and a second secure channel (via communication path 580, data network 590, and communication path 565) with destination SSD 560, via which third party 510 writes the read digital data into destination SSD 560.

Figure 6:
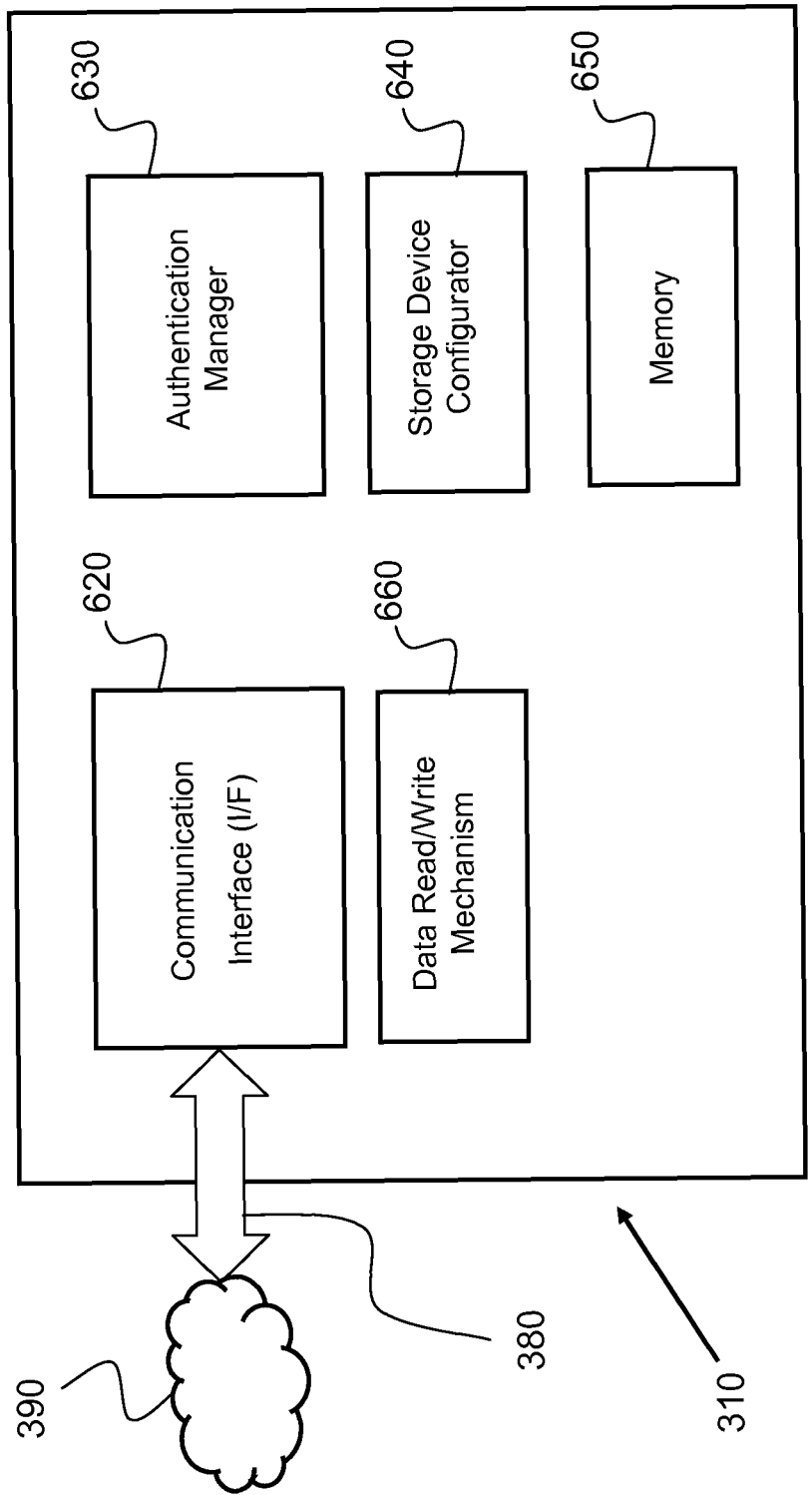
FIG. 6 is a block diagram of a third party according to an example embodiment.

FIG. 6 is a block diagram of third party 310 of FIG. 3 according to an example embodiment. FIG. 6 will be described in association with FIG. 3. Third party 310 includes a communication interface 620, an authentication manager 630, a storage device configurator 640, a memory 650, and a data read/write mechanism 660.

If a user wants to back up multimedia content which is stored in source SSD 350 in destination SSD 360, the user activates, invokes, or interacts with, user application 370 to cause user application 370 to send a message to third party 310 that data back up service is required, and that source SSD 350 and destination SSD 360 are in place and ready for the data transfer. Invoking client application 370 also causes third party 310 to commence a communication session with the SSDs in question, and specifies to third party 310 the service requested by the user. The service requested by the user may be, for example: transfer of the digital data from source SSD 350 to third party 310 and holding it there temporarily (e.g., several days), or (assuming the digital data is already held in third party 310) transfer of the digital data from third party 310 to destination SSD 360, or transfer of the digital data from source SSD 350 to third party 310 and concurrent transfer of the digital data from third party 310 to destination SSD 360, or disabling destination SSD 360 immediately after third party 310 writes the digital data into destination SSD 360, or disabling source SSD 350 and enabling destination SSD 360, and so on.

As explained above, the first phase in backing up a source SSD's digital data in a destination SSD (i.e., the backup SSD) is copying the source SSD's digital data to the destination SSD. In order to copy the digital data from the source SSD to the destination SSD the third party initiates a data copy session that includes the following stages: (1) Authentication stage (2) Establishment of virtual secure channel between the source SSD and the destination SSD via the third party (3) Reading, by the third party, data from the source SSD (4) (re)Configuration, by the third party, of the destination SSD and (5) Writing, by the third party, the data read from the source SSD to the destination SSD. As explained above, another phase (i.e., the post data-copy phase) has to be executed, which includes reversibly disabling, by the third party, the destination SSD for as long as the owner or user of the source SSD can use the source SSD. If the owner or user of the source SSD can use the source SSD this means that the source SSD is still operable (i.e., "enabled", "usable", or "active"). The post data-copy phase also includes disabling the source SSD and enabling the destination SSD if the owner or user of the source SSD and the destination SSD want to swap the two SSDs because s/he can no longer use the source SSD, for whatever the reason may be.

(1) Authentication

Successful transfer of the multimedia content of source SSD 350 to destination SSD 360 necessitates also transfer of data from the restricted storage area of source SSD 350 to the restricted storage area of destination SSD 360, and also transfer of data from the security management storage area of source SSD 350 to the security management storage area of destination SSD 360.

Before third party 310 transfers any data to destination SSD 360, third party 310 has to request (i.e., to read) it first from source SSD 250. Before source SSD 350 complies with the request (i.e., before source SSD 350 starts transferring the requested data to third party 310, via communication interface 620), a first authentication session has to be commenced during which third party 310 and source SSD 350 authenticate each other.

The first authentication session involves checking by source SSD 350 the authenticity of third party 310 to ensure that third party 310 is eligible to receive protected data that are stored in the restricted storage area and in the security management storage area of source SSD 350, and checking by authentication manager 630 the authenticity of source SSD 350 to ensure that source SSD 350 is eligible to be backed up by another SSD. Authentication manager 630 logs-on into the system of source SSD 350 before it commences the first authentication session.

Authentication manager 630 commences a second, separate, authentication session during which third party 310 and destination SSD 350 authenticate each other. The second authentication session involves checking by destination SSD 360 the authenticity of third party 310 to ensure that third party 310 is eligible to write data into its restricted storage area and into its security management storage area, and checking by authentication manager 630 the authenticity of destination SSD 360 to ensure that destination SSD 360 is eligible to back up another SSD. Authentication manager 630 logs-on, via communication interface 620, into the system of destination SSD 360 before it commences the second authentication session. The first authentication session and the second authentication session may be performed by exchanging authentication certificates between the involved parties, and by using the PKI paradigm, as described in more detail below in connection with FIG. 7.

Authentication manager 630 may log-on, via communication interface 620, into the system of source SSD 350 and destination SSD 360 by using the SSDs' Access Control Record ("ACR"). Briefly, "ACR" is an access control paradigm that can be viewed as a "super authority record" because an ACR contains information for indexing and it can be linked both to bibliographic records, relational databases, and to other related access control records. The ACR concept shifts from the traditional concept of "authority control" to "access control".

(2) Establishment of a Virtual Secure Channel

After source SSD 350 and third party 310 authenticate each other (during the first authentication session), authentication manager 630 and the secure storage controller (not shown in FIG. 3) of source SSD 350 establish there between a first secure channel, for example by using a first session key that is available to both of them, and after destination SSD 360 and third party 310 authenticate each other third party 310 and destination SSD 360 establish a second secure channel, for example by using a second session key that is available to both of them. As explained above, the second secure channel and the first secure channel may be established concurrently. It is noted, though, that the second secure channel may be established at any time after the first secure channel was established, or before the first secure channel is established. The first session key and the second session key may be randomly generated by the involved parties per communication session, or they may be fixed and stored in third party 310 and in the respective SSD during manufacturing thereof.

With respect to the first alternative (i.e., random generation of the first and second session keys), authentication manager 630 initiates the establishment of the first secure channel and, responsive to that initiative, authentication manager 630 and source SSD 350 jointly generate the first session key, as described in more detail in connection with FIG. 7, which is described below. The first session key is used by source SSD 350 to encrypt the digital data (in order to secure it) that has been requested by authentication manager 630 before source SSD 350 communicates the digital data to authentication manager 630, and upon receiving, via communication interface 620, the encrypted data from source SSD 350, authentication manager 630 uses the first session key to decrypt the encrypted digital data. Authentication manager 630 may use the first session key to decrypt the encrypted digital data upon completion of transferring thereof from source SSD 350 to authentication manager 630, or at any other time, such as right before authentication manager 630 is instructed or decides (depending on user application 370) to write the digital data into destination SSD 360. It is noted that the digital data of source SSD 350 may be pre-encrypted by source SSD 350 before encryption thereof with the first session key, to further increase the security level of the communicated digital data. For example the digital data may be pre-encrypted by source SSD 350 by using a content key that is available to destination SSD 360.

Likewise, authentication manager 630 may, at any time after it receives from source SSD 350 the digital data encrypted with the first session key, initiate the establishment of the second secure channel and, responsive to that initiative, authentication manager 630 and destination SSD 360 jointly generate the second session key. Authentication manager 630 uses the second session key to encrypt the digital data (to secure it) that is to be copied to destination SSD 360 before authentication manager 630 communicates the digital data to destination SSD 360. Upon receiving the encrypted data from authentication manager 630, destination SSD 360 uses the second session key to decrypt the encrypted digital data. It is noted that either of the first session key and the second session key may be generated first. That is, it is insignificant which session key (i.e., the first session key or the second session key) is generated first.

An encrypted data may be stored in the user storage area of source SSD 350 but the decryption key that is required to decrypt it may be stored in the restricted storage area or in the security management storage of source SSD 350. Therefore, it is imperative that encrypted data are transferred from the source SSD to the destination SSD along with the associated encryption/decryption keys, and other secure-related data/information, that are typically stored in one of the restricted storage areas (i.e., in the restricted storage area or in the security management storage area) of the involved SSD.

In an alternative way the virtual secure channel may be established, via third party 310, by source SSD 350 and by destination SSD 360 by using a predetermined content key that is available to source SSD 350 to encrypt the digital data, and to the destination SSD 360 to decrypt the encrypted digital data. In this alternative third party 310 is communication-wise transparent, in the sense that third party 310 serves as or provides a communication junction to source SSD 350 and to destination SSD 360 but it is not proactively involved in encryption or decryption of data.

(3) Reading Data from a Source SSD

After the first session key is generated, authentication manager 630 uses data read/write mechanism 660 to read whatever data there are to copy to destination SSD 360 from the user storage area, restricted storage area, and from the security management storage area of source SSD 350. Third party 310 includes a memory 650 for holding a list of authentication certificates of SSDs that can benefit from the data back up service rendered by third party 310, and also for temporarily holding the digital data that third party 310 reads from source SSD 350. Data that is held temporarily in memory 650 will be deleted when it is no longer required so that no traceable data will remain in third party 310 for users to misuse or for hackers to tap or intercept.

(4) Configuration of a Destination SSD

It is essential that destination SSD 360 has the same configuration as source SSD 350 because it is function-wise imperative that, in addition to the copied multimedia content and related protected data, the data structure of source SSD 350 is also transferred to destination SSD 360, or else data will be stored in a wrong way or in a wrong storage area, for example, in the user storage area instead of in the restricted storage area, or in the restricted storage area instead of in the user storage area, which will make or render the copied multimedia content permanently unusable. "Data structure" is a way of storing data in a computer so that the stored data can be accessed and used efficiently. In particular, "data structure" refers to the arrangement of digital data inside an SSD, the type and meaning of each data item, the absolute and relative location of each data item in the SSD's memory, and so on. Data structure is defined as part of the SSD's configuration. Therefore, in order for destination SSD 360 to hold an exact copy of the digital data as stored in source SSD 350, third party 310 has to ensure that the configuration of destination SSD 360 matches that of source SSD 350 before third party 310 writes the source SSD's digital data into destination SSD 360, for example, by using data read/write mechanism 660. In order to achieve that, authentication manager 630 inquires for, or requests from, source SSD 350 information about, or data representative of, its configuration, and source SSD 350 can comply with the inquiry or request by notifying third party 310 of its configuration. Source SSD 350 may notify third party 310 of its configuration, for example, by sending to third party 310 a configuration table. After being notified by source SSD 350 of its configuration, authentication manager 630 causes storage device configurator 640 to use the configuration information obtained from source SSD 350 to configure destination SSD 360 in the same way as source SSD 350. It may, therefore, be said that storage device configurator 640 imposes, or enforces, the configuration of source SSD 350 on destination SSD 360.

(5) Writing the Source SSD's Digital Data into the Destination SSD by the Third Party After storage device configurator 640 enforces the configuration of source SSD 350 on destination SSD 360 authentication manager 630 uses data read/write mechanism 660 to write the digital data it received from source SSD 350 into destination SSD 360.

(6) Disabling a Destination SSD

As explained above in connection with FIG. 2, the third party reversibly disables the destination SSD in order to adhere to the concept that there must not be more than one legitimate usable copy of multimedia content. Therefore, after authentication manager 630 reads (by using read/write mechanism 660) the digital data from source SSD 350, third party 310, or the source SSD, reversibly disables destination SSD 360 in order not to allow any device to use the destination SSD 360 for as long as the owner or user of source SSD 350 can, or want to, use source SSD 350. Disabling a destination SSD may be executed by causing, by the third party, the destination SSD to manipulate data stored therein, or using any of methodology that is described herein, for example, in connection with FIG. 2.

Figure 7:
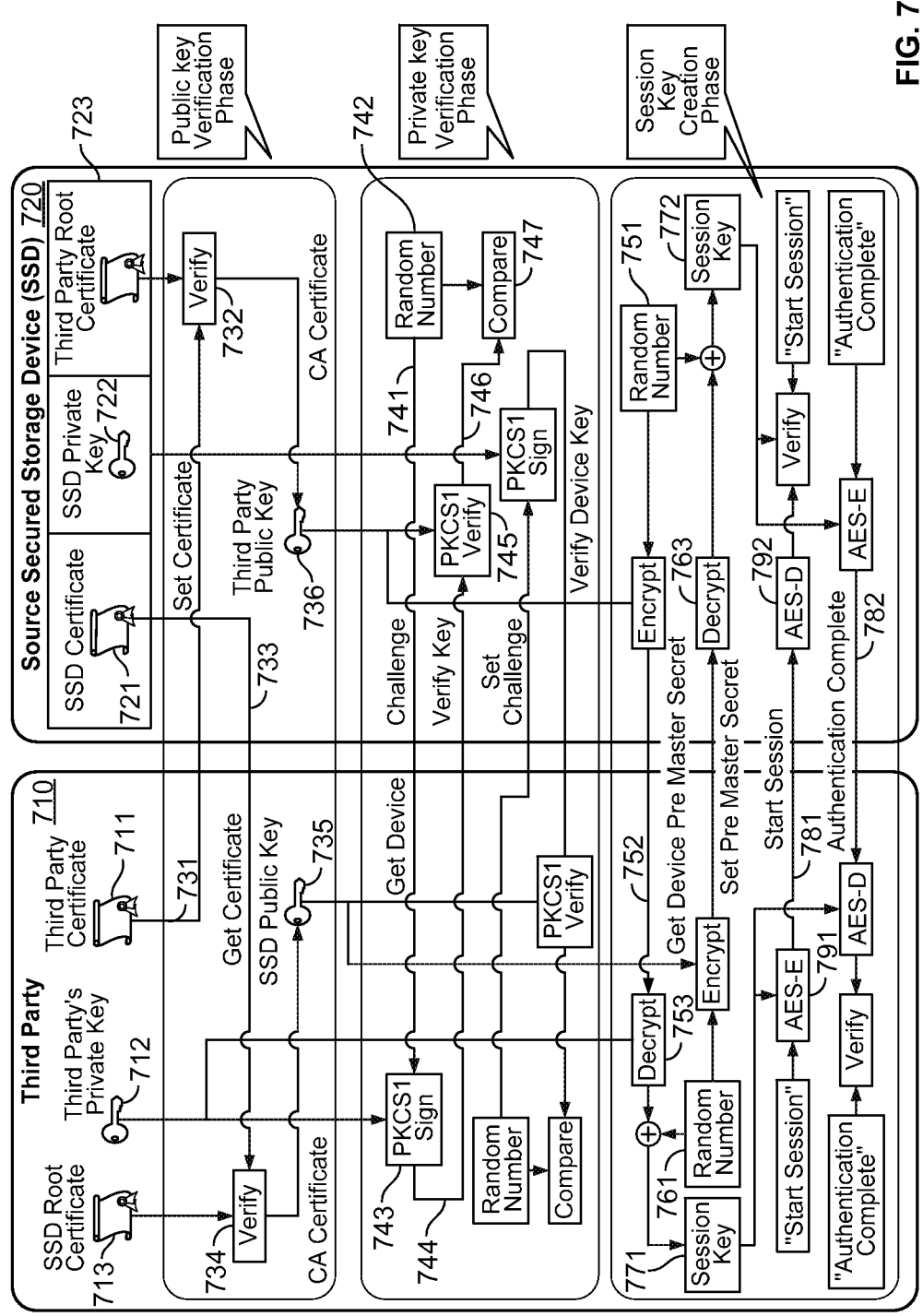
FIG. 7 is a diagram illustrating an authentication process and session key generation according to an example embodiment.

FIG. 7 shows an authentication method for authenticating a third party 710 to a source SSD 720, and vice versa, according to an example embodiment. The authentication process involves exchanging authentication certificates and using the Private Key Infrastructure (PKI) methodology, as described below.

Third party 710, which may be similar or identical to third party 310 of FIGS. 3 and 6, has stored therein a third party certificate 711, a third party private key 712, and a root certificate 713 of, or associated with, source SSD 720. Third party certificate 711 includes a public key of third party 710. Likewise, source SSD 420, which may be similar or identical to SSD 100 of FIG. 1, has stored in its security management storage area an SSD certificate 721, an SSD private key 722, and a third party root certificate 723. SSD certificate 721 includes a public key of source SSD 720. The authentication process may include the following phases: (1) Public Key Verification (2) Private Key Verification and (3) Session Key Agreement, which are discussed below.

Public Key Verification

Responsive to a user instruction to commence a data back up process (for example by using a user application such as user application 370), third party 710 issues and sends a "Set-Certificate" command 731 to source SSD 720 to start a mutual authentication session.

Being the initiator, third party 710 sends with Set-Certificate command 731 its authentication certificate ("i.e., "Third party Certificate" 711). In response to the Set-Certificate command 731 source SSD 720 utilizes "Third Party Root Certificate" 723 to verify (shown at 732) the authenticity of Third Party Certificate 711. If verification fails, source SSD 720 aborts the authentication process. If the authentication certificate of third party 710 ("i.e., "Third party Certificate" 711) is verified by source SSD 720 (shown at 732), source SSD 720 responds to command 733 (i.e., "Get-Certificate") that was issued by third party 710 by sending to third party 710 its own authentication certificate (i.e., "Source SSD Certificate" 721).

Third party 710 receives the source SSD's authentication certificate (i.e., "Source SSD Certificate" 721) and verifies (shown at 734) the authenticity of "Device Certificate" 721 by using Source Device Root Certificate 713. If this verification is also successful both parties (third party 720 and source SSD 720) get each other's public key from the corresponding authentication certificate: third party 710 has the public key 735 of source SSD 720 by virtue of verified Source SSD Certificate 721, and source SSD 720 has the public key 736 of third party 710 by virtue of verified Third party Certificate 711. After completion of this phase the two parties move on to the next phase, which is the "Private Key Verification" phase. Third Party Root Certificate 723 is typically stored in the hidden storage restricted (hidden) storage area of the SSD.

Private Key Verification

A private key of an SSD or of the third party may be verified by using various cryptographic schemes, one of which is described hereinafter. Private Key Verification is accomplished by using a double-sided challenge-response mechanism, where source SSD 720 challenges third party 710 by using command 741 ("Get_Challenge"), which source SSD 720 provides to third party 710 with a relatively long (e.g., 32-byte) challenging random number (shown at 742) that is generated by source SSD 720. Third party 710 responds to command 741 ("Get_Challenge") by signing (shown at 743) the challenging random number by using Third Party Private Key 712, according to the RSA cryptographic scheme that is defined in PKCS#1 version 2.1, or according to any other suitable version that exists today or that may be devised in the future. Briefly, "RSA" (the initials of the surnames Rivest, Shamir and Adleman) is a cryptography algorithm used to sign and encrypt digital data. RSA involves using a public key that can be known to everyone and is used for encrypting messages, and a private key. Messages encrypted with the public key can only be decrypted by using a matching (i.e., an associated) private key.

The signed response (shown at 744) is verified (shown at 745) by source SSD 720 by using Third Party Public Key 736, according to the RSA cryptographic scheme that is defined in PKCS#1 version 2.1, which results in the extraction of a number that is expected to be the random number 742. If the extracted number matches random number 742, this indicates to source SSD 720 that third party 710 is who it says it is and that third party 710 is eligible to receive digital data from source SSD 720. If the number extracted at 745 differs from random number 742, the authentication fails and source SSD 720 aborts the authentication process.

Third party 710 utilizes a similar challenge-response mechanism to challenge source SSD 720. That is, third party 710 generates and sends a random number to source SSD 720 and checks whether the number returned by source SSD 720 matches the generated random number. If the two numbers match, this indicates to third party 710 that source SSD 720 is who it says it is and that source SSD 720 is eligible to be backed up by a destination SSD. If the numbers do not match, the authentication procedure fails and third party 710 aborts the authentication process. After completion of the mutual authentication phase the two parties (i.e., third party 710 and source SSD 720) may move on to the next phase, which is the "Session Key Agreement" phase. The root certificate of the third party and the SSD's private key are usually stored in the restricted (hidden) storage area of the SSD.

Session Key Agreement

As explained above, a secure channel between a third party and a source SSD (referred to herein as the "first secure channel") may be established by using a session key (referred to herein as the "first session key") that may be available to third party 710 and source SSD 720 in several ways. That is, the session key can be generated by them (for example in the way demonstrated by FIG. 7) or provided to them from an external system or device.

The session key is used by third party 710 and source SSD 720 as part of the two-way (i.e., source SSD/third party) authentication, to complete their mutual authentication process, and also as a cipher key to cipher data that is exchanged between third party 710 and source SSD 720. The session key is jointly randomized by third party 710 and by source SSD 720 and is known to both of them because it consists of two random numbers (shown at 751 and 761), where one random number (i.e., random number 761) is generated by the third party 710 and sent after encryption to source SSD 720, and the other random number (i.e., random number 751) is generated by source SSD 720 and sent after encryption to third party 720, as described below.

Source SSD 720 generates random number 751 and sends it, after encryption (shown at 752) to third party 710, where it is decrypted (shown at 753). Third party 710 generates random number 761 and sends it, after encryption (shown at 762) to source SSD 720, where it is decrypted (shown at 763). The random number generated by each side may be 16-byte long and it may be encrypted according to the RSA cryptographic scheme as defined in PKCS#1 version 2.1. "XOR-ing" (performing "exclusive or" logical operation on) the two random numbers 751 and 761 at each party results in third party 710 and source SSD 720 having the same session key (respectively shown at 771 and 772). The session key would be the 16-byte of the binary value resulting from the XOR operation of the two random numbers.

After the session key is generated, source SSD 720 needs a proof that third party 710 has generated, and will be using, the same session key. As proof, third party 710 forwards (shown at 781) a "Start-Session" command that is AES ("Advanced Encryption Standard") encrypted (shown at 791) with session key 771. Source SSD 720 decrypts the "Start Session" command with session key 772 and verifies that the "Start Session" command includes a message "Start Session". If session keys 771 and 772 do not match, the authentication process fails and source SSD 720 aborts the login process. Otherwise, source SSD 720 utilizes session key 772 to encrypt and to send (shown at 782) "Authentication Complete" message 782 to third party 710. Third party 710 decrypts "Authentication Complete" message 782 with session key 771 and verifies that "Authentication Complete" message 782 contains the message "Authentication Complete". This last step completes the session key agreement process and opens a secure channel over which commands and data (e.g., the digital data) can be exchanged between third party 710 and source SSD 720 in a secure manner (i.e., encrypted). The session key will be used by third party 710 and source SSD 720 during the entire communication session, which is the period until third party 710 reads out the entire digital data that is stored in source SSD 720. The authentication and session keys generation process exemplified in FIG. 7 can likewise be used, mutatis mutandis, for authenticating third party 710 to a destination SSD and vice versa. That is, in the latter case the word "source" should be replace with the word "destination".

After the first and the second session keys are generated, the first secure channel is established by encrypting, by the source SSD, the digital data with the first session key that is available to the third party, and the second secure channel is established by decrypting, by the third party, the encrypted digital data with the first session key and encrypting the decrypted digital data with the second session key that is available to the destination SSD. The first session key and the second session key may be stored in the third party and in the respective SSD during manufacturing of the SSDs, or later. Encrypting the digital data by the source SSD with the first session key may include a prior step of encrypting, by the source SSD, the digital data with a content key that is available to the destination SSD but not to the third party. A content key may be stored in the source SSD and in the destination SSD during manufacturing thereof, or they may be generated by one party (e.g., the source SSD) and transferred to the other party (e.g., the destination SSD), the latter alternative being describe below, in connection with FIG. 8.

Third party 710 participates in the generation process of the encryption keys required to establish the virtual secure channel that includes a first secure channel with source SSD 720 and a second secure channel with a destination SSD (not shown in FIG. 7). However, as explained above, a third party may copy digital data from a source SSD to a destination SSD without the third party generating an encryption/decryption key, and without the third party knowing which encryption/decryption key(s) is/are used by the source SSD and destination SSD, as shown in FIG. 8, described below.

Figure 8:
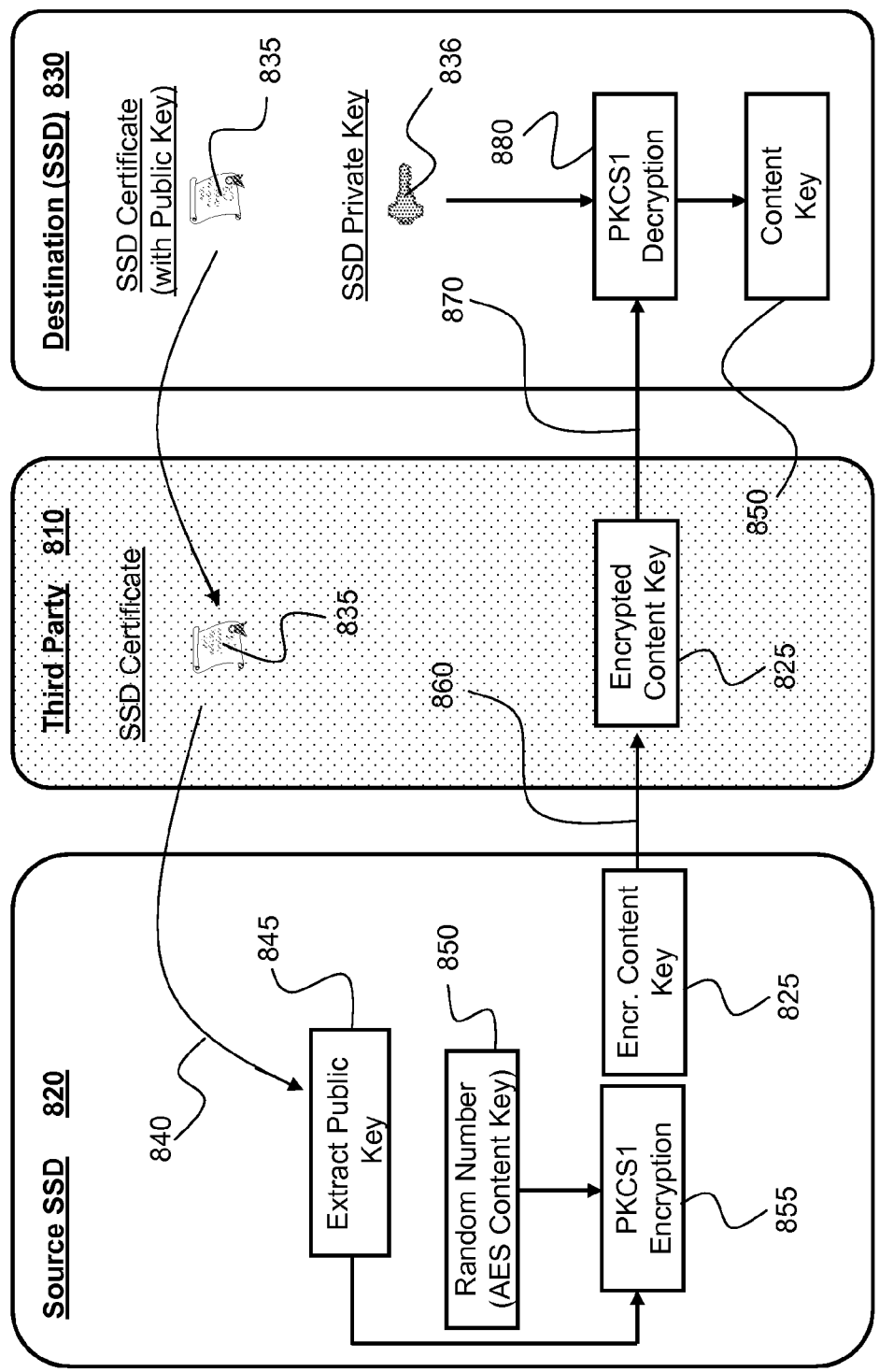
FIG. 8 is a diagram illustrating a content key generation according to an example embodiment.

FIG. 8 shows a method for generating a content key by source SSD 720 according to an example embodiment. In order to maintain confidentiality of the digital data while it is forwarded (by and via third party 810) from source SSD 820 to destination SSD 830, source SSD 820 and destination SSD 830 take on the security responsibility with the third party taking on a mediatory role, as described below. It is assumed that third party 810, source SSD 820, and destination SSD 830 already completed the public key and private key verification phases described above in connection with FIG. 7, and, consequently, that third party 810 associates destination SSD 830 with an authentication certificate that contains a public key of destination SSD 830. In general, source SSD 820 randomly generates a content key to encrypt its digital data prior to transmission thereof. Thereafter, source SSD 820 forwards the content key to destination SSD 830 so that destination SSD 830 can use the content key to decrypt the encrypted digital data. The content key generation process is performed as described below.

After third party 810 and destination SSD 830 authenticate each other third party 810 holds the authentication certificate 835 of destination SSD 730. In general, third party 810 forwards the public key of destination SSD 830 to source SSD 820; source SSD 820 utilizes the destination SSD's public key to encrypt a content key (i.e., a key for ciphering data); and destination SSD 830 utilizes the content key to decrypt the encrypted data. To achieve that, third party 810 forwards 840 the authentication certificate 835 of destination SSD 830 to source SSD 820, and source SSD 820 verifies that SSD certificate 835 of destination SSD 830 is signed by the destination's SSD's root authentication certificate held by the third party. Once the signature on the destination's SSD's root certificate is verified by source SSD 820, source SSD 820 extracts 845 the public key of destination SSD 830 from the destination SSD's authentication certificate. Source SSD 820 generates a random number 850 that serves as the content key. Then, source SSD 820 encrypts 855 the random number (i.e., the content key) with the extracted public key of destination SSD 830, signs the encrypted content key with the source SSD's private key, concatenates the source SSD's authentication certificate to the signed encrypted content key, and forwards 860 the signed encrypted content key 825 to third party 810. Third party 810 forwards at 870 encrypted content key 825, as is, to destination SSD 830. Destination SSD 830 then ensures that the source SSD's authentication certificate has been signed by the source SSD's root authentication certificate held by third party 810, and uses its private key 836 to decrypt the encrypted content key. Destination SSD 830 also uses the source SSD's public key, which is held in the source SSD's certificate, to ensure that the content key has not been changed.

From this point on source SSD 820 can securely send digital data to destination SSD 830 via third party 810. Absent knowledge of the destination SSD's private key, third party 810 cannot decrypt any data that source SSD 820 forwards through it to destination SSD 830, which is desired security-wise. Third party 810, therefore, transfers, or relays, the authentication certificate/public key of destination SSD 830 from destination SSD 830 to source SSD 820, and the encrypted content key from source SSD 820 to destination SSD 830. Alternatively, a content key may be made available to a source SSD during its manufacturing and to a destination SSD by transferring the content key to the destination SSD from or via the third party. Alternatively, a content key may be made available to the source SSD by transferring it from the destination SSD via the third party.

Figure 9:
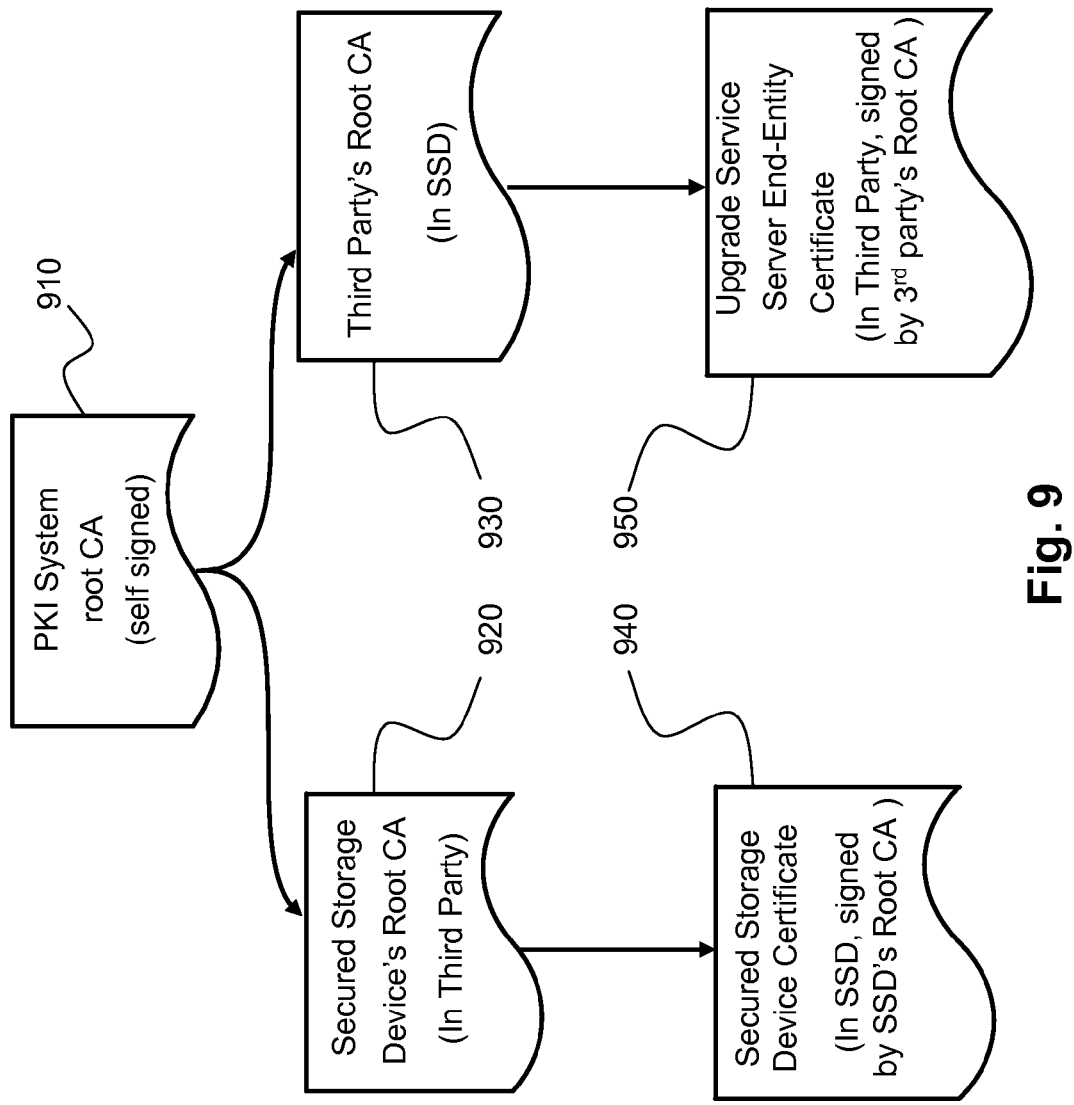
FIG. 9 shows typical authentication certificates' hierarchy.

FIG. 9 shows an exemplary authentication certificates' hierarchy. PKI system Root CA ("CA" stands for "Certifying Authority") 910 is trusted by secured storage devices and by service providers. Secured Storage Device's Root CA 920, which is the SSD's unique root CA, is contained in, or held by, a third party to allow the third party to authenticate an SSD. The third party may hold a list of SSD's root CAs for SSDs that are entitled to the data back up service rendered by the third party. Likewise, Third Part's Root CA 930, which is the third party's root CA, is contained in or held by an SSD. Each of Secured Storage CA Device's Root CA 920 and Third Part's Root CA 930 is signed by PKI system Root CA 910. Therefore, it may be said that a commonly trusted authority (i.e., PKI System Root CA 910) delegates trust to Secured Storage CA Device's Root CA 920 and to Third Part's Root CA 930. Secured Storage Device Certificate 940, which is the SSD's certificate, is contained in or held by the SSD and signed by Secured Storage Device's Root CA 920. Likewise, Third Party Certificate 950, which is the third party's certificate, is contained in or held by the SSD and signed by Third Party's Root CA 930.

As stated above, the third party trusts Secured Storage CA Device's Root CA 920, and the SSD trusts Third Party's Root CA 930. Therefore, mutual trust between the third party and the secured storage device can be facilitated by placing, storing, or holding Secured Storage CA Device's Root CA 920 in the third party, and by placing, storing, or holding Third Party's Root CA 903 in the SSD. More specifically, the third party will trust the SSD only if the third party receives from the SSD an authentication certificate that has been signed by the Secured Storage Device's Root CA 920. Likewise, the SSD will trust the third party only if the SSD receives from the third party an authentication certificate that has been signed by the Third Party's Root CA 903. With respect to the third party and source SSD, successful authentication also means that the third party is eligible, authorized, or entitled to receive, or read, digital data from the source SSD, and that the source SSD is eligible, authorized, or entitled to the data back up service rendered by the third party. With respect to the third party and destination SSD, successful authentication also means that the third party is eligible, authorized, or entitled to write digital data into the destination SSD, and that the destination SSD is eligible, authorized, or entitled to back up the source SSD.

Figure 10:
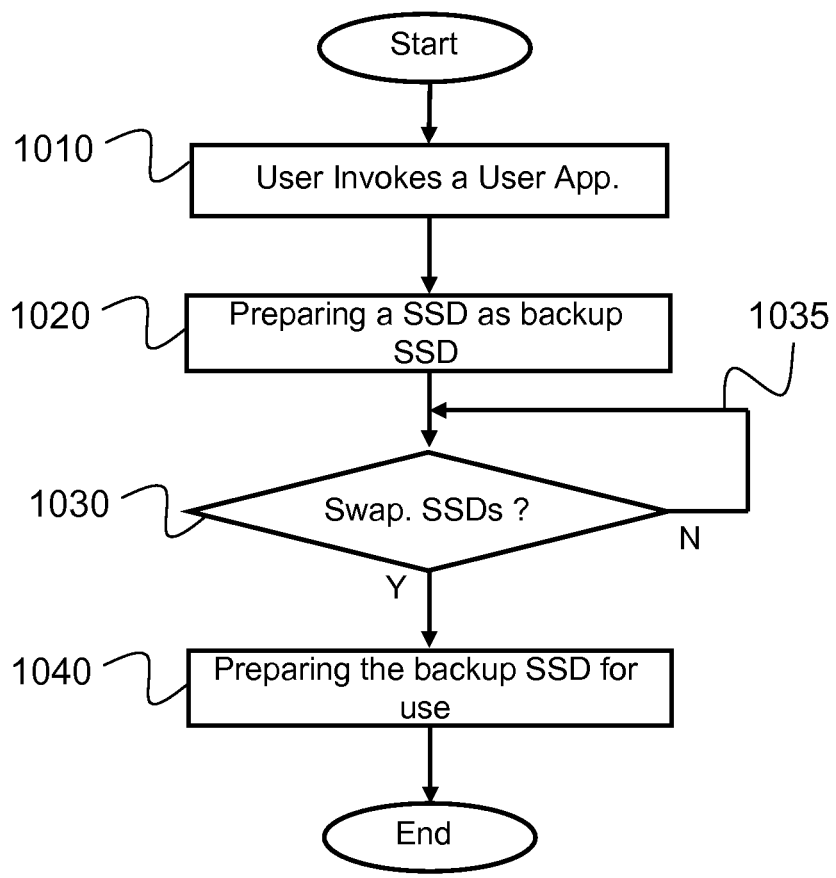
FIG. 10 is a high level method for copying protected data from a source SSD to a destination SSD according to an example embodiment.

FIG. 10 shows a high level method for backing up digital data of an SSD (referred to herein as a "source SSD") in another SSD (referred to herein as a "destination SSD") according to an example embodiment. FIG. 10 will be described in association with FIG. 3.

Assuming that source SSD 350 contains, or stores, digital data that includes protected data that cannot be transferred to (i.e., backed up by) ineligible devices, and that a user wants to back up the digital data of source SSD 350 in destination SSD 360, the user inserts source SSD 350 into card reader 330 and destination SSD 360 into card reader 340 and, at step 1010, invokes user application 370 on host device 320 to prompt third party 310 to execute a data backup process, or to commence a data backup session with source SSD 350 and destination SSD 360.

The data backup process includes two separate phases: a "backup SSD preparation" phase, which third party 310 executes at step 1020 to prepare the backup SSD (which, in this example, is destination SSD 360) for backing up data, and a "backup SSD usage preparation" phase, which third party 310 executes at step 1040 to make the backup SSD usable or operable. In order for a data backup process to take place, several backing up eligibility prerequisites have to be satisfied, as explained herein.

Preparing a backup SSD (i.e., preparing an SSD as backup device) generally means copying the digital data of a backed up SSD (i.e., a source SSD) to a backup SSD (i.e., a destination SSD), and keeping the backup SSD dormant (i.e., inactive, inoperable, unusable, or disabled) so that its digital data cannot be used by any device at least for as long as the original digital data stored in the backed up (i.e., in the source) SSD is used, or can be used, by its legitimate user or owner. Assuming that the eligibility prerequisites are satisfied, third party 310 establishes, there though, a virtual secure channel between source SSD 350 and destination SSD 360 and copies the digital data of source SSD 350 to destination SSD 360 over the established virtual secure channel.

After third party 310 prepares destination SSD 360 as backup it waits, at step 1030, for user application 370 to issue a back up request. The back up request is also referred to as "SSD swap instruction" to operationally swap the two SSDs. If user application 370 has not yet issued a swap instruction (shown as "N" at step 1030), third party 310 continues (shown at 1035) to wait for a swap instruction.

If source SSD 350 has been stolen, lost or damaged, its legitimate user can invoke user application 370 to send an SSD swap instruction to third party 310. Upon, concurrently, subsequent or responsive to receiving an SSD swap instruction from user application 370 (shown as "Y" at step 1030), third party 310 prepares the backup SSD (e.g., destination SSD 360) for use. Third party 310 has to prepare the backup SSD for use because at this stage the backup SSD is disabled; i.e., the digital data copied thereto from the source SSD is unusable. Preparing an SSD as a backup SSD and preparing a backup SSD for use are more elaborated in FIG. 11, which is described below.

Figure 11:
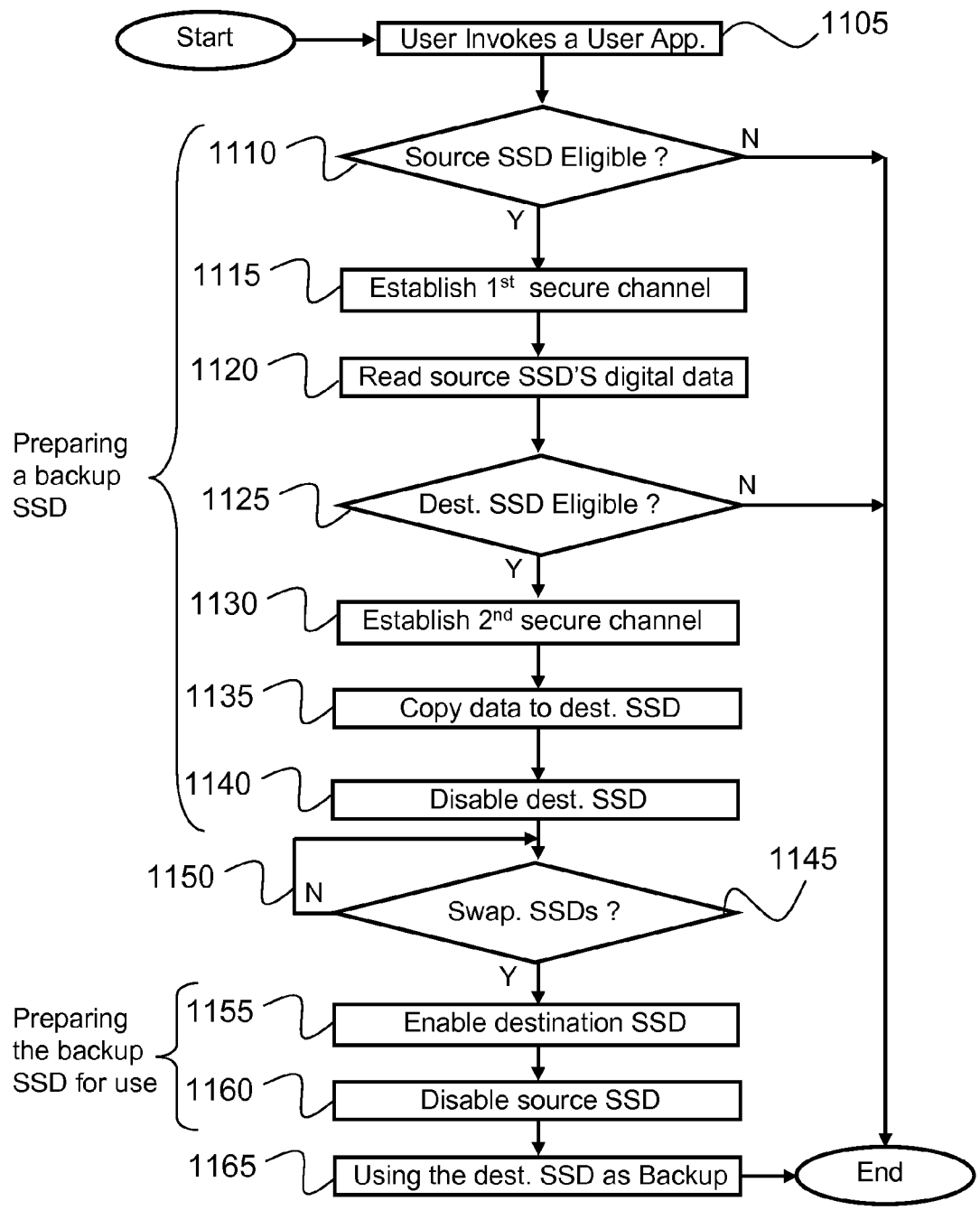
FIG. 11 is the method of FIG. 10 shown in more detail.

FIG. 11 shows a method for preparing an SSD as backup SSD and thereafter preparing the backup SSD for use according to an example embodiment. FIG. 11 will be described in association with FIG. 3.

A user inserts a source SSD into a host device system 305 and invokes, at step 1105, user application 370 on the host device system 305 to prompt third party 310 to execute a data backup process, or to commence a data backup session with source SSD 350 and destination SSD 360. As described above in connection with FIG. 10 the data backup process includes a first phase in which third party 310 prepares a backup SSD, and a second phase in which third party 310 prepares the backup SSD for use.

Preparing a Backup SSD

Before destination SSD 360 can be prepared as a backup SSD for source SSD 350, source SSD 350, destination SSD 360 (i.e., the intended, or potential, backup SSD), and third party 310, have to satisfy eligibility prerequisites. For example, at step 1110 third party 310 checks whether source SSD 350 is eligible to be backed up by a destination SSD, or by another SSD for that matter. If third party 310 determines that source SSD 350 is not eligible to be backed up by a destination SSD (shown as "N" at step 1110), third party 310 terminates, or aborts, the data backup process. However, if third party 310 determines that source SSD 350 is eligible to be backed up by destination SSD 360 (shown as "Y" at step 1110), third party 310 establishes, at step 1115, a first secure channel with source SSD 350 (over communication line 380, data network 390, and communication line 355). The first secure channel with source SSD 350 is part of a virtual secure channel that third party 310 completes later between source SSD 350 and destination SSD 360. Third party 310 will complete the virtual secure channel only after destination SSD 360 proves to third party 310 its eligibility to back up source SSD 350, or to back up SSDs in general.

At step 1120 third party 310 reads the digital data (which includes the protected data) from source SSD 350 over the first secure channel and, according to one example, holds the read digital data until it is time to transfer it to a destination SSD 360. According to another example third party 310 may hold the read digital data for an additional time period (e.g., months or years) after the digital data was copied to destination SSD 360. The latter example is useful if the backup SSD is also stolen, lost, or damaged, because the digital data may likewise be stored in another/new SSD. According to yet another example third party 310 may hold the read digital data for a predetermined time period (e.g., 2 days) after which third party 310 will delete it regardless of whether it was copied to destination SSD 360, or to another backup SSD, or not. If third party 310 deletes its copy, it may get another copy of the digital data from the source SSD in question later.

At step 1125 third party 310 checks whether destination SSD 360 is eligible to back up source SSD 350, or another source SSD for that matter. If third party 310 determines that destination SSD 360 is not eligible to back up source SSD 350 (shown as "N" at step 1125), third party 310 terminates, or aborts, the data backup process. However, if third party 310 determines that destination SSD 360 is eligible to back up source SSD 350 (shown as "Y" at step 1125), third party 310 establishes, at step 1130, a second secure channel with destination SSD 360 (over communication line 380, data network 390, and communication line 365), to thereby complete the virtual secure channel between source SSD 350 and destination SSD 360. At step 1135 third party 310 copies to destination SSD 360, over the second secure channel, the digital data (including the protected data) it previously read from source SSD 350 over the first secure channel. After the digital data of source SSD 350 is copied to destination SSD 360, and assuming that source SSD 350 is still in use by its legitimate user or owner, third party 310 disables, or inactivates, at step 1140, destination SSD 360 so that its digital data cannot be used by any device.

At step 1150 third party 310 checks whether an SSD swap instruction has been received from user application 370. If no such instruction has been received (shown as "N" at step 1145), it is assumed that the user of source SSD 350 can still use the original SSD (i.e., source SSD 350) and, therefore, destination SSD 360 remains disabled, inoperable, unusable, or inactive, and third party 310 continues to wait or to mute (shown at 1150) for a swap instruction. By "third party 310 continues to wait" is meant that third party 310 can either be operative (switched "on") and actually waiting for the instruction, or inoperative (switched "off"). However, because the service rendered by third party 310 is an on-line service, third party 310 should be operative, waiting for back up requests, or SSD swap instructions, to be received from users.

Upon, subsequent, or responsive to receiving an SSD swap instruction from user application 370 (shown as "Y" at step 1150) third party 310 enables, activates or revives, at step 1155, destination SSD 360 and, at step 1160, third party 310 disables or inactivates source SSD 350 to make sure that only one copy of the digital data is usable, which, from now on, is the copy stored in destination SSD 360.

After source SSD 350 is disabled it is required to enable destination SSD 360 (the backup SSD) for allowing it to be used instead of the disabled SSD (i.e., instead of source SSD 350). Therefore, at step 1165 destination SSD 360 is enabled and, thereafter, used as if it were (i.e., instead of) source SSD 350, at this point source SSD 350 and destination SSD 360 may be thought of as having been swapped.

It is noted that the order of the steps described so far (e.g., steps 1110 through 1135, inclusive) may be executed in a different order, as third party 310 may check the eligibility of destination SSD 360 before or concurrently with checking the eligibility of source SSD 350, and establish the second secure channel before or concurrently with establishing the first secure channel, as the case may be (i.e., depending on the features and options provided by user application 370, and on the options actually selected by the user).

If source SSD 350 can still be used by its legitimate owner or user, usage of destination SSD 360 (i.e., usage of its digital data) by any device must be prevented. Likewise, if, for some reason, the legitimate owner or user of source SSD 350 wants to use destination SSD 360 instead of source SSD 350, usage of source SSD 350 (i.e., usage of its digital data) by any device must be prevented. If usage of an SSD (e.g., source SSD 350 or destination SSD 360) by any device is prevented, the SSD whose usage is prevented may be regarded or thought of as being "inactive", "inoperable", or "disabled".

Alternative to the destination disabling methodologies described above, destination SSD 360 may be disabled by third party 310 by encrypting the digital data before or while the digital data is transferred to destination SSD 360. The digital data may be encrypted by using an encryption key that is known only to the third party, so that the digital data transferred to destination SSD 360 will be unusable by any device/SSD by virtue of encryption. However, if a device/SSD requests the encryption key from third party 310 in order to decrypt the encrypted digital data, third party 310 complies with the request after the relevant prerequisite conditions described above are satisfied. Upon completion of transferring of the digital data to the destination SSD user application 370 may present to the user a corresponding message (e.g., "backup process completed").

Third party 310 may maintain an SSDs revocation table listing revoked (i.e., disabled) source SSDs. Third party 310 fills in the SSDs revocation table, or updates the table with, new source SSDs every time third party 310 receives an identifier of a new source SSD. Third party 310 marks a source SSD as "revoked" (i.e., disabled) prior to, or immediately after third party 310 copies the source SSD's digital data to a backup/destination SSD. Upon, subsequent or responsive to third party 310 receiving from a host a request to use a specific SSD, third party 310 searches the SSDs revocation table for the specific SSD, and if the specific SSD is marked in that table as "revoked" third party 310 sends a message to the host hosting the specific SSD, "telling" the host that the specific SSD has been revoked and, therefore, it should not be used.

The process involved in sending the host's request to the third party to use the specific SSD, and the response of the third party to that response is called herein "publishing" or "publishing an identifier of a source SSD"). The third party may update the SSDs table and send an updated SSDs table to the host device system every once in a while.

An SSD may be a flash memory device. The flash memory device may be selected from the group including (the list not being exhaustive) Trusted Flash device, Secure Digital ("SD"), miniSD, microSD, Hard Drive ("HD"), Memory Stick ("MS"), USB device, Disk-on-Key ("DoK"), iNAND, and the like. It is noted that the source SSD and/or the destination SSD may be non-flash device.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of secured mass storage devices such as SD-driven flash memory cards, flash storage device, non-flash storage devices, and so on.

What is claimed is:

1. An apparatus configured to communicate with a destination secured storage device, comprising:
   an authentication manager;
   a processor configured to execute the authentication manager to authenticate a destination secured storage device, the destination secured storage device containing unusable digital data originating from a source secured storage device, the unusable digital data including secure data that is not transferable to unauthorized devices, and to establish a secure channel with the authenticated destination secured storage device; and
   a storage device configurator adapted to configure the destination secured storage device to match a configuration of the source secured storage device by transferring a data structure to the destination secured storage device and to disable operation of the destination secured storage device after the unusable digital data has been written to the destination secured storage device, to disable the source secured storage device to render digital data stored therein unusable, and after rendering the digital data unusable at the source secured storage device, to enable the destination secured storage device over the secure channel in order for the unusable digital data in the destination secured storage device to become usable, wherein enabling the destination secured storage device includes reinstating operation of the destination secured storage device, wherein the storage device configurator is configured to receive an identifier of the source secured storage device via the destination secured storage device in order for the identifier to be used to disable the source secured storage device.

2. The apparatus of claim 1, wherein the storage device configurator is further configured to enable the destination secured storage device by reinstating modified data in the destination secured storage device.

3. The apparatus of claim 1, wherein the storage device configurator is further configured to publish the identifier to a host device of the source secured storage device in order to disable the source secured storage device.

4. The apparatus of claim 1, further comprising a data read/write mechanism configured to read the digital data from the source secured storage device and to write the read digital data into the destination secured storage device over a channel that is secure.

5. The apparatus of claim 4, wherein the authentication manager is further configured to authenticate the source secured storage device prior to the data read/write mechanism reading the digital data from the source secured storage device.

6. The apparatus of claim 4, wherein the digital data that the data read/write mechanism reads from the source secured storage device includes the identifier of the source secured storage device.

7. The apparatus of claim 6, wherein the storage device configurator is further configured to disable the source secured storage device by publishing the identifier of the source secured storage device to a host device of the source secured storage device.

8. The apparatus of claim 1, further comprising a revocation table maintaining a list of a plurality of disabled source storage devices, wherein the revocation table is updated in response to receiving the identifier from the destination secured storage device.

9. The apparatus of claim 1, further comprising a storage device configured to store the digital data for a time period after the digital data is written to the destination secured storage device, and wherein the time period is longer than one day.

10. The apparatus of claim 1, further comprising a memory to store the digital data.

11. A source secured storage device comprising:
    a memory storing digital data and a configuration data structure of the source secured storage device, the digital data including secure data that is not transferable to unauthorized devices; and
    a secure storage processor configured to determine whether a destination secured storage device or a third party device is authorized to receive therefrom the digital data and, if so, to establish a secure channel between the secure storage processor and the destination secured storage device or between the secure storage processor and the third party device, to transfer the digital data to the destination secured storage device directly or via the third party device for back up over the corresponding secure channel, to transfer the configuration data structure to the third party device for configuration of the destination secured storage device to match a configuration of the source secured storage device, to transfer an identifier to the destination secured storage device, and to disable operation of the destination secured storage device after the digital data has been transferred to the destination secured storage device, wherein the destination secured storage device is enabled to use the digital data responsive to reinstatement by the third party device of operation of the destination secured storage device, and wherein the digital data is configured to be rendered unusable to the source secured storage device by disabling, by the third party device, the source secured storage device using the identifier.

12. The source secured storage device of claim 11, wherein the secure storage processor is further configured to disable the destination secured storage device in order to render the digital data unusable.

13. The source secured storage device of claim 12, wherein the secure storage processor renders the digital data of the destination secured storage device unusable prior to, during, or after the secure storage processor transfers the digital data to the destination secured storage device or to the third party device.

14. The source secured storage device of claim 11, wherein the secure storage processor transfers the identifier to the third party device or to the destination secured storage device during mutual authentication with the third party device or the destination secured storage device or as data embedded in the digital data transferred to the destination secured storage device.

15. The source secured storage device of claim 11, wherein the secure storage processor is further configured to determine whether the source secured storage device is authorized to send to the destination secured storage device the digital data that includes the secure data which is not transferable by the source secured storage device if unauthorized and, if so, to send the digital data of the source secured storage device directly from the source secured storage device or via the third party device.

16. The source secured storage device of claim 15, wherein, if the digital data received from the source secured storage device is usable, the secure storage processor is further configured to disable the destination secured storage device so that the digital data received from the source secured storage device is rendered unusable.

17. The source secured storage device of claim 16, wherein the secure storage processor is further configured to prepare the destination secured storage device for use as a backup secured storage device by rendering the unusable digital data in the destination secured storage device usable.

18. The source secured storage device as in claim 17, wherein the digital data in the source secured storage device is rendered usable by reinstating data in the destination secured storage device.

19. The source secured storage device as in claim 17, wherein as part of the preparation of the destination secured storage device to operate as a backup secured storage device, the secure storage processor sends the identifier of the source secured storage device to the third party device in order for the identifier to be published by the third party device to a host device of the source secured storage device so that the digital data stored in the source secured storage device is not usable.

20. A method of operating a third party device to enable backing up digital data of a source secured storage device, the method comprising:
authenticating a destination secured storage device by the third party device, the authenticated destination secured storage device containing unusable digital data originating from a source secured storage device, the unusable digital data including secure data that is not transferable to unauthorized devices;
causing, by the third party device, a transfer of a configuration data structure from the source secured storage device to the authenticated destination secured storage device such that configurations of the source secured storage device and the authenticated destination secured storage device match;
disabling, by the third party device, operation of the destination secured storage device after the unusable digital data has been written to the destination secured storage device;
establishing, by the third party device, a secure channel with the authenticated destination secured storage device;
at the third party device, disabling the source secured storage device to render the digital data stored therein unusable;
receiving at the third party device an identifier of the source secured storage device via the authenticated destination secured storage device, the identifier to be used by the third party device to disable the source secured storage device; and
after the source secured storage device is disabled, enabling, by a processor of the third party device, operation of the destination secured storage device over the secure channel in order for the unusable digital data in the destination secured storage device to become usable.

21. The method of claim 20, further comprising reinstating, by the third party device, an attribute of the destination secured storage device.

22. The method of claim 20, wherein digital data in the destination secured storage device is made unusable prior to, during, or subsequent to the digital data being copied from the source secured storage device to the destination secured storage device.

23. The method of claim 20, further comprising rendering the digital data in the destination secured storage device unusable by at least one of changing the digital data before or as it is being transferred to the destination secured storage device, modifying an attribute of the destination secured storage device, and configuring the digital data at the destination secured storage device.

24. The method of claim 20, further comprising determining that the source secured storage device is authorized to be backed up by the destination secured storage device.

25. The method of claim 24, further comprising determining that the destination secured storage device is authorized to back up the source secured storage device.

26. The method of claim 20, further comprising publishing the identifier of the source secured storage device to disable the source secured storage device.

27. The method of claim 20, wherein the identifier from the source secured storage device is transferred to the destination secured storage device during mutual authentication between the source secured storage device and the destination secured storage device.

28. The method of claim 20, further comprising embedding the identifier in the unusable digital data.

29. The method of claim 20, wherein the third party device receives the identifier after the destination secured storage device has been enabled.

30. The method of claim 20, further comprising publishing the identifier in response to a request from at least one of an end-user and a user application.

* * * * *